United States Patent [19]

Goto et al.

[11] Patent Number: 5,471,267
[45] Date of Patent: Nov. 28, 1995

[54] INFORMATION RECORDING APPARATUS OF CAMERA

[75] Inventors: Tetsuro Goto, Funabashi; Kosho Miura, Kamakura, both of Japan

[73] Assignee: Nikon Corporation, Tokyo, Japan

[21] Appl. No.: 126,360

[22] Filed: Sep. 24, 1993

[30] Foreign Application Priority Data

Sep. 25, 1992 [JP] Japan .................. 4-256100
Mar. 23, 1993 [JP] Japan .................. 5-088011
Apr. 9, 1993 [JP] Japan .................. 5-107546

[51] Int. Cl.$^6$ ......................... G03B 17/24
[52] U.S. Cl. ......................... 354/106; 354/105
[58] Field of Search ................... 354/21, 105, 106

[56] References Cited

U.S. PATENT DOCUMENTS

| | | | |
|---|---|---|---|
| 4,423,938 | 1/1984 | Tominaga | 354/106 |
| 4,705,372 | 11/1987 | Lapeyre | 354/106 |
| 4,888,610 | 12/1989 | Tsujimoto et al. | 354/475 |
| 4,958,174 | 9/1990 | Goto et al. | 354/106 |
| 5,155,513 | 10/1992 | Matsumura et al. | 354/106 |
| 5,220,368 | 6/1993 | Kikukawa et al. | 354/106 |
| 5,245,373 | 9/1993 | Ogawa et al. | 354/106 |
| 5,276,470 | 1/1994 | Fridman | 354/106 |

FOREIGN PATENT DOCUMENTS

| | | |
|---|---|---|
| 4-273233 | 9/1992 | Japan . |
| 5-127246 | 5/1993 | Japan . |

*Primary Examiner*—Russell E. Adams
*Assistant Examiner*—Nicholas J. Tuccillo

[57] ABSTRACT

An information recording apparatus performs a variety of characteristic actions to record, information on a photographing film, including a claim of copyright. As one version thereof, the information recording apparatus is constructed to make switchable a system of fully recording four figures of year number and a system of automatically recording low-order two figures, depending on whether or not the number of figures of a person's name is larger than a predetermined number of figures. Further, the information recording apparatus is constructed to surely record the copyright data on the film by making a timing of recording the copyright data different from a timing of recording date/hour information. The information recording apparatus is further constructed to preferentially record the copyright data on the film by independently controlling a recorder for recording the copyright data and a recorder for recording other date/hour information.

9 Claims, 23 Drawing Sheets

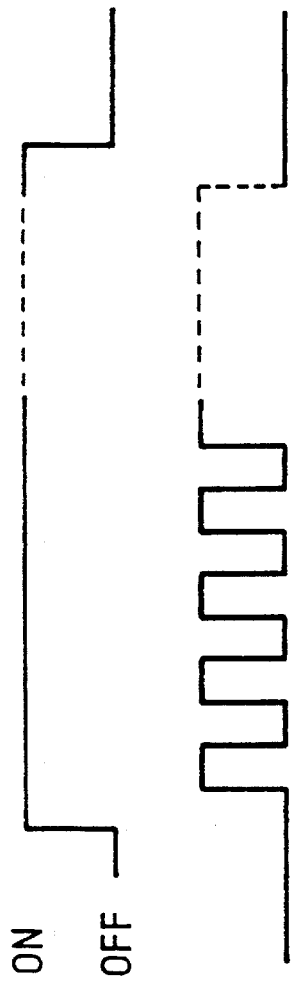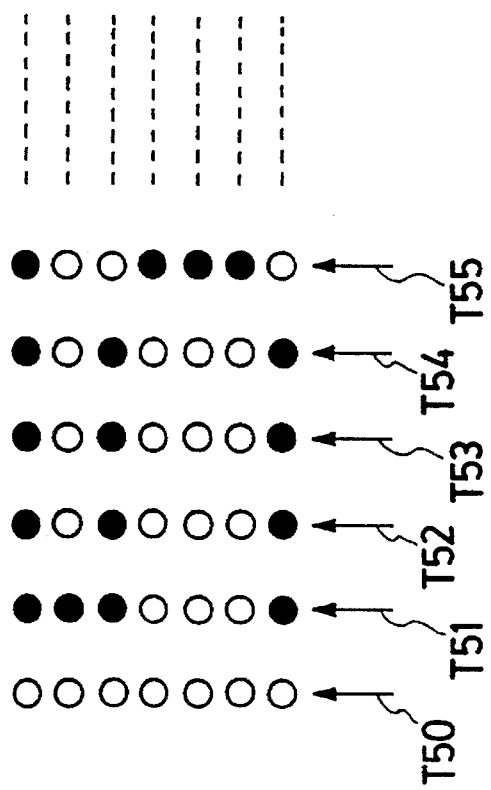
FIG. 13A
FIG. 13B
FIG. 13C

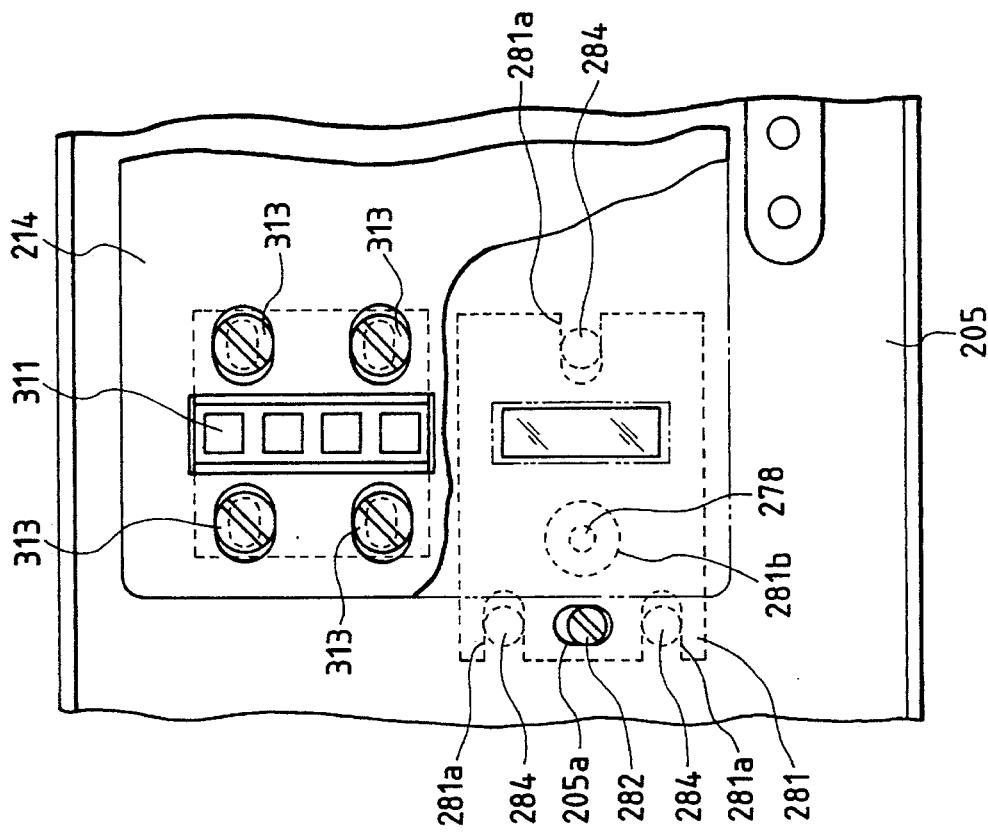
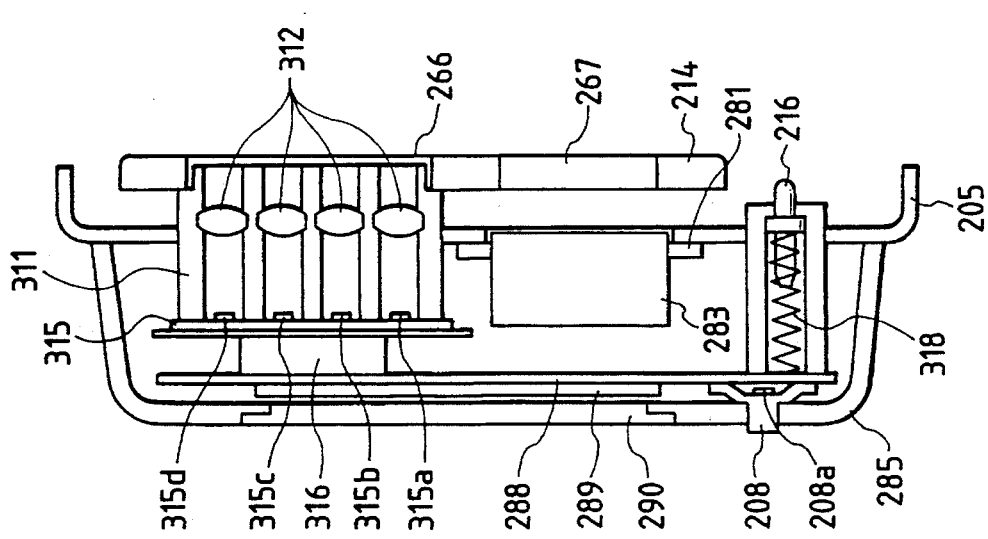

INFORMATION RECORDING APPARATUS OF CAMERA

BACKGROUND OF THE INVENTION

1. Field of the Invention

The present invention relates to an information recording apparatus of a camera, for recording information of letters, etc., on a photosensitive film of a photo or the like, particularly for recording a copyright of a photographer.

2. Related Background Art

An apparatus, called a databack, for optically recording information related to photographing on a film has hitherto been available on the commercial basis. This apparatus optically records desired alphanumeric characters internally and externally of photographing frames on the film through LEDs (light emitting diodes) or the like. A photographing time and date are automatically recorded in addition to a subject image by the databack, and, hence, this is convenient for a rearrangement to be made afterward.

The information related to photographing given above generally includes time/date data on a photographing date, month and year, f-number data, shutter'speed data and a photographing film frame number. These items of information are divergently employed ranging from some record of a memorial photo to scientific photography.

There are two ways of timing when the above-mentioned information is recorded.

A first method is to record the information in synchronism with a photographing timing. Set data are recorded through 7-segment LEDs in the midst of action to depress a shutter button, i.e., an exposure or during a rewinding action of the film. This method exhibits such a merit that a shot of picture and a data record can be recorded substantially simultaneously.

A second method is to record the information with the rewinding action of the film on which the photography has been completed. The data set in relation to respective photographing frames are stored in a predetermined storage device. When rewound, the data are read and recorded by use of vertically-arranged 7-dot LEDs while being made corresponding to frame numbers. This method has such a merit that the inexpensive 7-dot LEDs are usable because of utilizing the fact that a film feeding speed is substantially fixed when rewound.

On the other hand, a professional camera man is always aware of a copyright for the picture taken by himself or herself. For claiming that the picture is a peculiar work of photographer's own, an indication of the copyright, the photographing date, month and year and his or her name are invariably written on the back of print paper. It is thereby possible to specify the photographer, make a claim as to where the copyright belongs to and further receive a protection thereof. Thus, an unauthorized copy, etc., by others can be forbidden.

Inventors of the present invention have already invented a method of automatically recording an indication of the copyright on a photographed film by combining the two elements described above in Japanese Patent Application No. 3-318631. Stored on the film are optical records of a set of a mark indicating an existence of the copyright, year number and a person's name other than the typical calendar data on the date, month and year.

SUMMARY OF THE INVENTION

The following problems inherent in the copyright databack are to be predicted. A minimum dimension of size of recording letters formed by LEDs or the like is determined depending on whether visually recognizable or not. A maximum dimension of size of a record module consisting of the LEDs and a driver thereof is determined depending on whether capable of being housed in a rear cover or not. It therefore follows that a physical limit exists in terms of the number of recordable letters.

The problem of the limit in the number of letters is comparatively small in the case of names of Japanese. For example, as in the case of "© 1992 GOTO", nine figures may suffice. Herein, © is a mark as shown by 50 and 60 in FIGS. 4A and 4B.

On the other hand, names of westerners generally require a relatively large number of figures. For instance, as seen in "© 1992 TCHAIKOVSKY", as many as 16 figures are needed in some cases.

Although it is required that the recorded name be as complete as possible for claiming the copyright, it can be subjected to some abbreviation. Therefore, the copyright databack demands a capability of recording a considerable number of figures. This is, however, hard to attain because of the physical problems given above.

Accordingly, it is a primary object to provide an information recording apparatus of a camera that is capable of accurately recording a person's name even when the person's name to be recorded is long enough to exceed a predetermined number of figures.

Further, as explained above, in the data recording based on the second method, or in other words, in the apparatus for recording the data by use of the 7-dot LEDs in synchronism with the film rewinding action, the recording data set corresponding to the respective frames are generally stored in a semiconductor memory. The data are read for use of recording. However, it takes a comparatively long time in some cases till the film is rewound from a photographing time of the first frame, depending on a frequency of using the camera. In the meantime, a battery for backing up the semiconductor memory is consumed up, and it may happen that the recording data stored therein are deleted.

Further, there exists a possibility that the radioactive rays pass through the cell in the semiconductor memory, with the result that the recording data are deleted or changed into different data.

If any one of the phenomena described above appears in the copyright data, it is impossible to specify the photographer and make a claim as to where the copyright belongs to. This is a quite serious problem.

It is another object of the present invention to provide an information recording apparatus of a camera that is capable of eliminating troubles in which the important recording data are deleted or changed into different data due to the fact that the battery for backing up the semiconductor memory is consumed up for a long duration of actions from photographing to rewinding, or the radioactive rays pass through the cell in the semiconductor memory in an information recording apparatus of a camera of such a type that shot-recording of the recording data set when photographed is not immediately executed on that occasion, but the data are temporarily stored in the semiconductor memory, read and then recorded when rewinding the film afterward.

Furthermore, a conventional databack apparatus has been demanded of only the function to record a date, a time, a film count value and exposure data. A device for shot-recording is constructed of so-called 7-segment elements arranged and capable of expressing only the numerals. It is therefore impossible to record a name of the copyright owner in letters.

As stated above, enabling the record of the letters involves the use of 14-segment elements or (5×7) dot matrix elements. The record is, however, effected in an extremely narrow space between the photographing pictures. The elements themselves in the databack apparatus therefore have to decrease in size. There newly arises problems of causing a decline in letter quality and an increase in manufacturing costs.

Supposing that an extremely small element is to be attained, as described above, sixteen or more figures are required for expressing a person's name as the case may be. Hence, there are needed a complicated processing circuit for driving all these segments and a large amount of current consumed.

Besides, many problems are produced when inputting the person's name. To give one example, a display device including a large number of segments has to be similarly prepared for confirming the letters inputted in some cases.

The conventional databack apparatus presents the problems described above. This is conducive to many obstacles against actualizing the databack capable of shot-recording the mark and person's name relative to the copyright. On the other hand, the following problems arise when actually performing the record associated with the copyright.

Normally, when claiming the copyright for the work, three items of data of a copyright mark, a copyright owner's name and a published year should be recorded. However, the published year is, though the former two items (copyright mark and copyright owner's name) are indispensable conditions, not said to be the indispensable one for the following reason. There exist two ways of thinking about the validity term of the copyright in Japan, wherein the validity term is 50 years after the death of the copyright owner (Article 51 of the Copyright Law), and the validity term is 50 years from the published year (Article 52 of the Copyright Law in the case of the name being unknown or the work with a changed name). The validity term of the copyright in the U.S. extends over a life-time of the copyright owner or is 50 years after the death of the copyright owner. The copyright has such validity terms, and, therefore, the published year data have a priority lower than the former two items of data. Accordingly, when designing the shot-recording apparatus explained above, at the first onset, the former two items of data are preferentially recorded. Subsequently, the published year should be recorded.

In this type of known example, however, all the data have hitherto been shot-recorded simultaneously; or alternatively, no statement is given to those points at all. According to the method of simultaneously recording all the data, there exists a possibility that no data is recorded, or some of the data become thin in density due to an abrupt drop in voltage when recorded. If the data have a high priority, it is impossible to claim the copyright.

It is still another object of the present invention to provide an information recording apparatus capable of simply recording a mark and a person's name relative to the copyright and preferentially recording important data without using intricate circuitry and special light emitting elements.

According to the present invention, a copyright recording apparatus is provided with a first mode in which a year number is recordable in four figures and a second mode in which the year number is recordable in two figures. The copyright recording apparatus is also provided with a setting unit for setting the person's name and a judging unit for judging the number of figures given by the setting unit. The copyright recording apparatus is further provided with a selecting unit for selecting the first mode when the judging unit judges that the number of figures of the person's name is smaller than a predetermined number of figures but the second mode when larger than the predetermined number. It is thus possible to accurately record the persons's name by such an arrangement that the year number is automatically changed over to a 2-figure recording method when the name to be recorded is long enough to exceed the predetermined number of figures.

Further, according to the present invention, the copyright recording apparatus is provided with a first mode in which the person's name is recordable in a full width and a second mode in which the name is recordable in a half-width. The copyright recording apparatus is provided with a setting units for setting the person's name and a judging unit for judging the number of figures given by the setting unit. The copyright recording apparatus is also provided with a selecting unit for automatically selecting the first mode when the number of figures of the person's name is smaller than a predetermined number of figures but the second mode when larger than the predetermined number. It is thus feasible to accurately record the person's name by such an arrangement that the letters are automatically set in the half-width when the person's name to be recorded is so long as to exceed the predetermined number of figures.

Still further, according to the present invention, in an information recording apparatus of a camera, for recording photography information stored in a storage device on a recording medium at a timing different from a timing of exposure, a control unit controls a recording unit to record, on the recording medium, the photography information other than the information stored in the storage device during an exposing action. Hence, the storage unit stores only unimportant information and does not store important information. With this arrangement, the important information such as copyright data is recorded on the medium concurrently with the exposure even when the information stored is deleted because of a battery being consumed up or changed into different information. This does not, therefore, induce a large demerit to the photographer.

Moreover, according to the present invention, a copyright recording apparatus is provided with a first recording unit for recording first data on the copyright in a first position in the vicinity of the photographing picture on the photographing film and a second recording unit for recording second data on a time and date in a second position different from the first position but in the vicinity of the photographing picture. The copyright recording apparatus is also provided with a control unit for independently control of the first and second recording unit. With this construction, it is possible to simply record a mark and a person's name relative to the copyright and preferentially record the important data without employing complicated circuitry and special light emitting elements.

BRIEF DESCRIPTION OF THE DRAWINGS

Other objects and advantages of the present invention will become apparent during the following discussion in conjunction with the accompanying drawings, in which:

FIGS. 13A to 13C are timing charts of the information recording apparatus;

FIG. 24 is a sectional view illustrating the information recording apparatus;

FIG. 25 is a front view showing the information recording apparatus;

DESCRIPTION OF THE PREFERRED EMBODIMENTS

Figure 1:
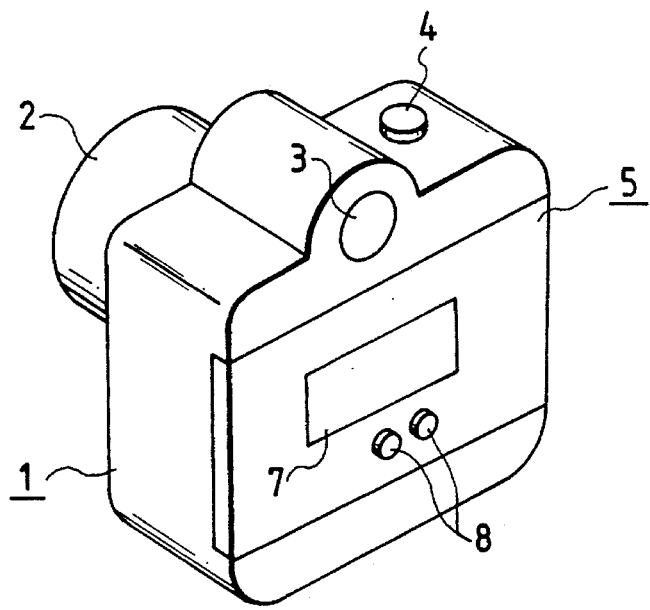
FIG. 1 is a sketch diagram showing a first embodiment where a camera is mounted with a databack.

FIG. 1 is a sketch diagram of a camera 1 mounted with a databack 5.

A subject image passing through a lens 2 incorporated into the camera 1 is visually recognizable through a viewfinder 3. When depressing a shutter button 4, the image is exposed on a film loaded therein. The databack 5 includes a plurality of manipulation buttons 8 and a display device 7 defined as an accessory on which the data relative to a copyright are recordable.

Figure 2:
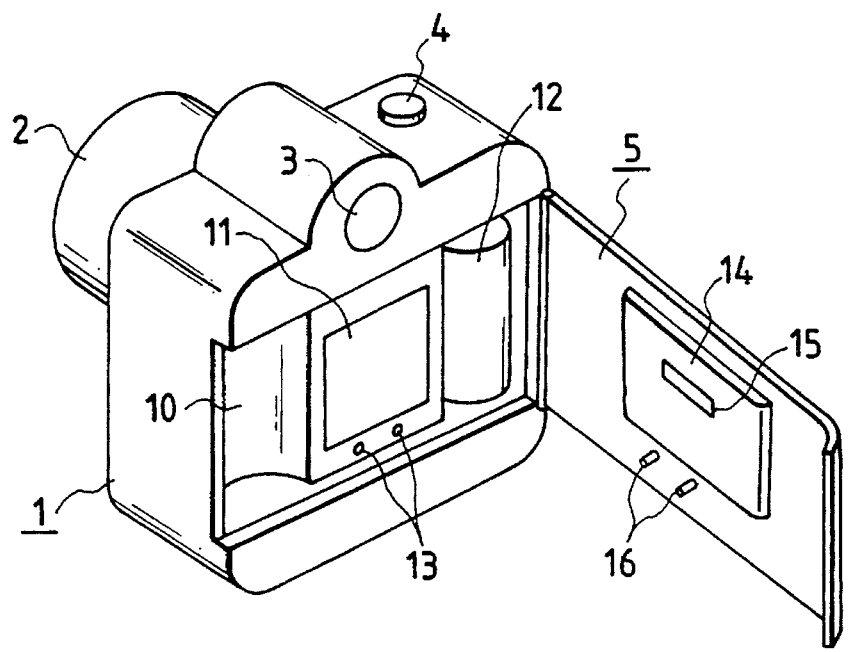
FIG. 2 is a sketch diagram showing a state where the databack of FIG. 1 is opened.

FIG. 2 is a sketch diagram illustrating a state where the databack 5 of FIG. 1 is opened.

An unillustrated film cartridge is loaded into a film chamber 10. The film drawn out is, after passing above an aperture 11, wound on a spool 12.

A beam of subject light penetrating the lens 2 is imaged on the film existing in the vicinity of the aperture 11 through an unillustrated shutter.

Herein, a presser plate. 14 serving to closely fit the film to the aperture 11 is fixedly provided inwardly of the databack 5.

A hole 15 is formed in a part of the presser plate 14. The data to be shot through this hole 15 are projected on the film rear surface and thus optically recorded thereon.

A data shot-recording signal functions to command the databack 5 to shot-record the data. The data recording signal is transferred and received via a plurality of paired contact points 13, 16 provided at a lower part of the aperture 11 of the camera 1 and at a lower part of the presser plate 14 of the databack 5.

Figure 3:
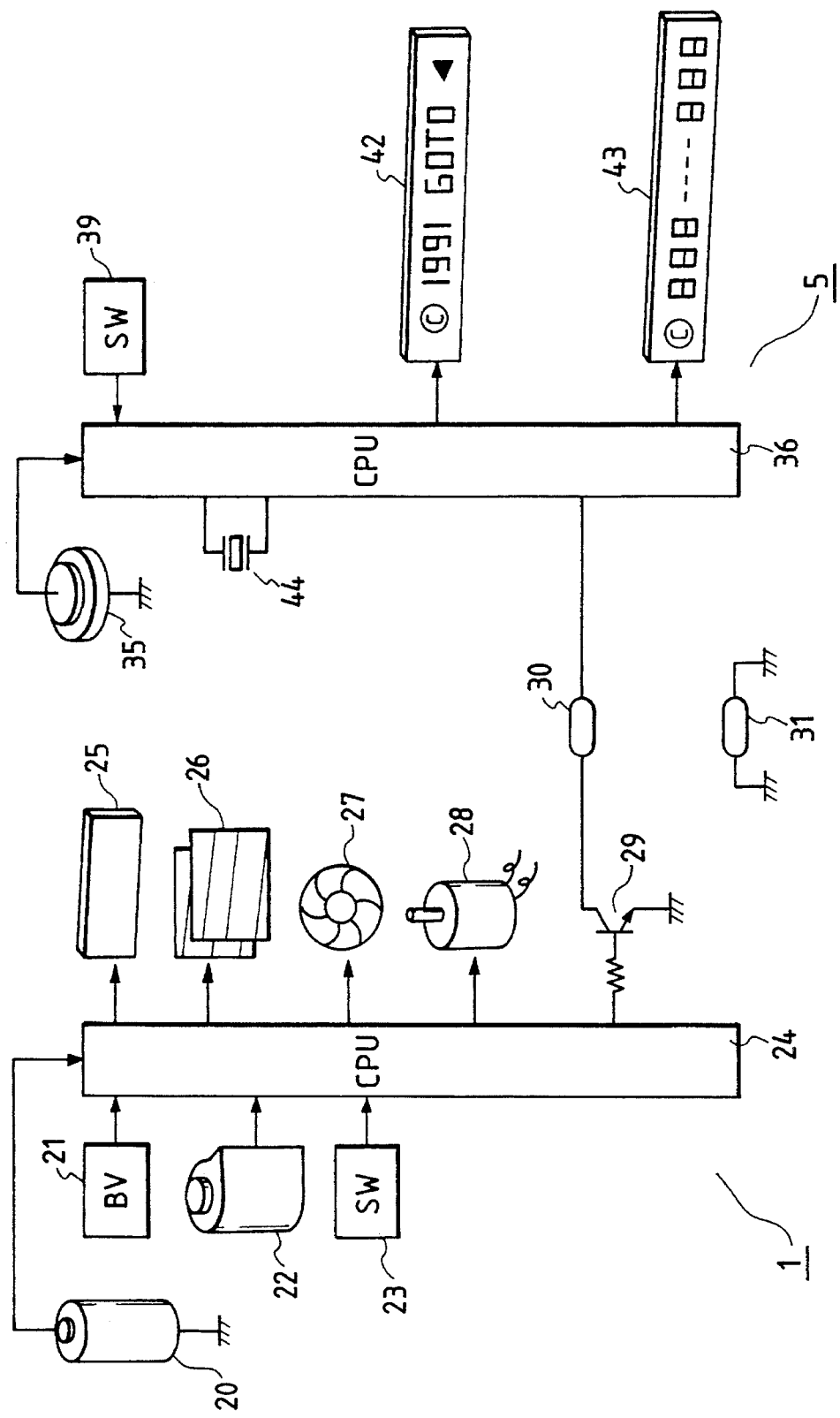
FIG. 3 is a block diagram showing an example of electric circuits of the camera and of the databack shown in FIG. 1.

FIG. 3 is a block diagram illustrating an example of electronic circuits in the databack 5 as well as in the camera 1. A left section from contact points 30, 31 corresponds to the camera 1, while a right section therefrom corresponds to the databack 5.

To begin with, the circuitry of the camera 1 will be explained.

An operation of the circuit depends entirely on the electricity supplied from a battery 20.

Control over the camera 1 is all executed dominantly by a CPU 24. Inputted, as known well, to the CPU 24 are a subject luminance signal from a photometric circuit 21, a film sensitivity signal from a film sensitivity detection circuit 22 and status signals from status detection circuits of a variety of switches.

Herein, the switch detection circuit 23 includes a release switch and a power switch interlocking with the shutter button 4 (FIGS. 1 and 2).

Then, the CPU 24 indicates exposure conditions through an LCD 25 provided inwardly of the viewfinder 3 and performs an exposure for a predetermined time by opening and closing the shutter 26. The CPU 24 also regulates a quantity of transmitted light by making variable an aperture diameter of a stop 27. The CPU 24 winds and rewinds the films with rotations of a motor 28. Further, the CPU 24 outputs the data recording signal via the contact point 30 to the databack 5 by driving a transistor 29. The contact point 31 is a signal terminal at a ground level. Herein, the contact points 30, 31 have the same definitions as those of the contact points 13, 16 shown in FIG. 2.

Next, the circuit of the databack 5 will be explained as below.

The battery 35 supplies the respective elements including a CPU 36 with electricity.

On-off statuses of the plurality of buttons 8 described above are inputted to the CPU 36 from a switch detection circuit 39. A registration of a person's name to be recorded can be changed by manipulating the button 8. Further, a data record timing signal is inputted thereto via the contact point 31.

On the other hand, the CPU 36 drives a display LCD 42 to display the record data. Further, the CPU 36 drives an LED array 43 to emit the light in accordance with the above-mentioned timing signal, thus executing the record of the data relative to the copyright.

Besides, an oscillator 44 for supplying an accurate original oscillation frequency is connected to the CPU 36, thereby counting the year number all the time. The year number counted is employed to update display segments which will be mentioned later at all times.

Figure 4A:
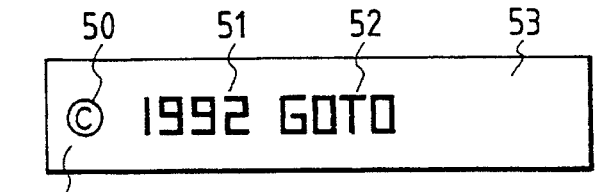
FIGS. 4A and 4B are diagrams showing a display mode in the first embodiment.
Figure 4B:
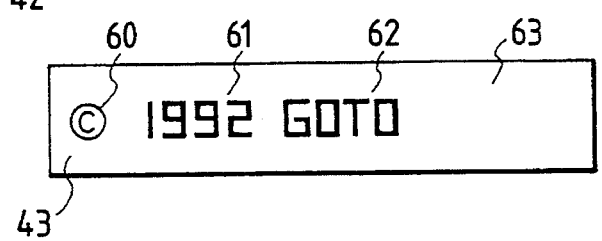

FIGS. 4A and 4B of a first display mode, showing a segment example of the LCD 42 and the LED array when the number of letters of a name does not exceed a predetermined number of figures. Referring to FIG. 4A, a segment 50 is a symbol mark of the copyright. This is the initial letter and gives an indication of being the copyright. A segment 51 indicates the year number when the copyright is enacted. A segment 52 corresponds to a name of copyright owner. Though what is displayed by segment 51 is a personal name in this embodiment, it is not limited to the personal name but it may be legal person's name. The name may be, as illustrated therein, only [family name] or [full name]. In the case of this embodiment, the family name is short, and, therefore, a blank segment 53 is prepared in rear of the segment 52. The blank 53 is a space where the segment is prepared for making a longer name displayable.

The number of figures necessary of the name, i.e., the total number of the figures of the segment 52 and the blank segment 53, is required to be restrained within a range reasonable in terms of price and physical aspects with respect to the databack 5 by performing a market research about existing family names. In general, the number of alphabetic letters needed for displaying a family name is said to be approximately 3 to 15.

FIG. 4B shows an example of flicker segments of the LED array 43. The same letters as those of FIG. 4A are flickered, thus effecting optical recording on the film.

Figure 5A:
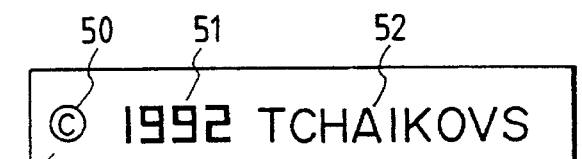
FIGS. 5A to 5C are diagrams showing another display mode in the first embodiment.
Figure 5B:
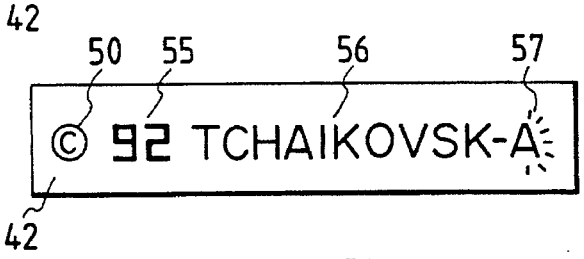
Figure 5C:
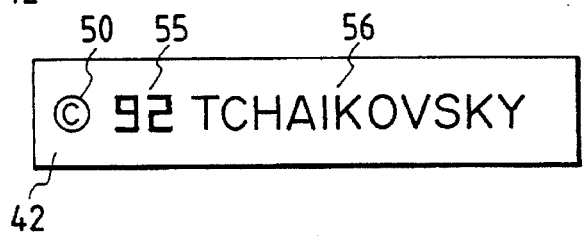

Next, FIGS. 5A, 5B and 5C illustrate display examples of the segments on the LCD 42 when the name consists of a large number of figures. [TCHAIKOVSKY] is given as an example of long family name. The number of the segments usable for displaying the name is nine in the arrangement shown in FIG. 5A. The segments 50, 51 will be explained in the same way with FIG. 4A.

FIG. 5A shows a display segment example where the name is being inputted. When completing the input up to "TCHAIKOVS", the segments come just to the limit (i.e. nine figures).

Subsequently, when further inputting a letter "K", as illustrated in FIG. 5B, the display of the year number displayed in four figures is changed over to a 2-figure display 55, and, simultaneously, the name display shifts left by 2 figures. Hence, "TCHAIKOVSK" is flicker-displayed in the segment 56. Further, an initial setting letter "A" as a new figure is flicker-displayed in the blank segment 57.

Herein, when further inputting a remaining letter, as shown in FIG. 5C, all the letters are displayed.

Figure 6:
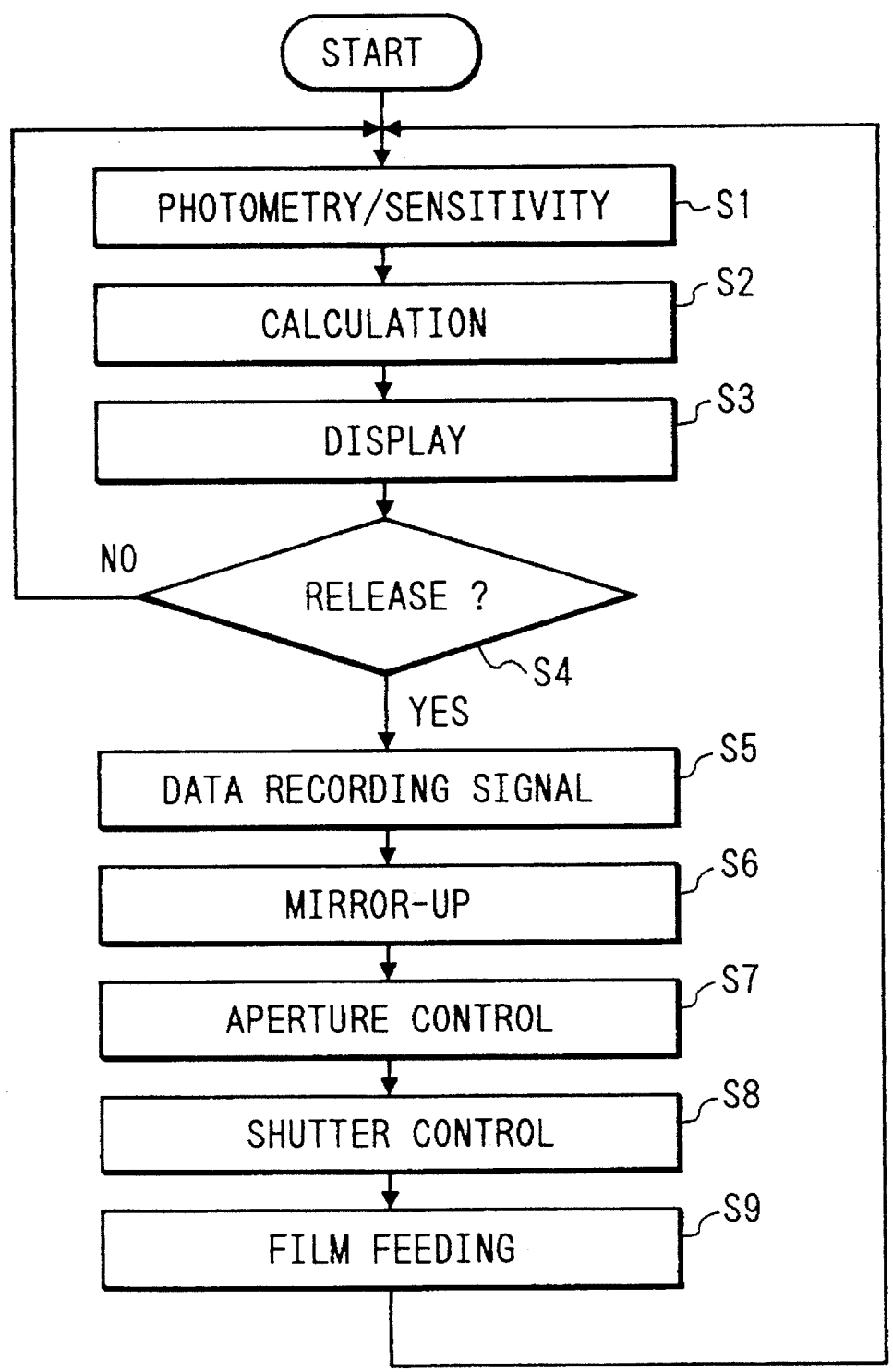
FIG. 6 is a flowchart showing a processing routine by a CPU of the camera.

FIG. 6 is an example of a processing routine by the CPU 24 in the camera 1. This routine is repeatedly executed during a supply of electricity to the CPU 24.

S1; Take in photometric and sensitivity signals from a photometric unit 21 and a sensitivity detecting unit 22.

S2; Calculate a shutter speed and an f-number that are defined as proper exposure conditions by a calculation about the two signals.

S3; Display the thus obtained exposure conditions and a photographing mode set by the switch status detection circuit 23 through an unillustrated display unit.

S4; Judge whether or not the release button 4 is depressed through the switch status detecting unit 28. If not, the action returns to S1, where the above-mentioned processes are repeated.

S5; Turn on the transistor 29 for a predetermined time because of the release button 4 being depressed. Command a data recording action to the databack 5 via the contact point 30.

S6; Move up an unillustrated reflecting mirror off a photographing light path.

S7; Adjust the stop 27 to a predetermined aperture of stop.

S8; Regulate the exposure on the film by opening and closing the shutter 26.

S9; Feed the film and energize the mechanism by causing forward rotations of the motor 28 because of the exposure being completed.

One cycle of the exposing actions is thus completed, and, hence, the action returns to S1 to repeat the above-described processes.

Figure 7:
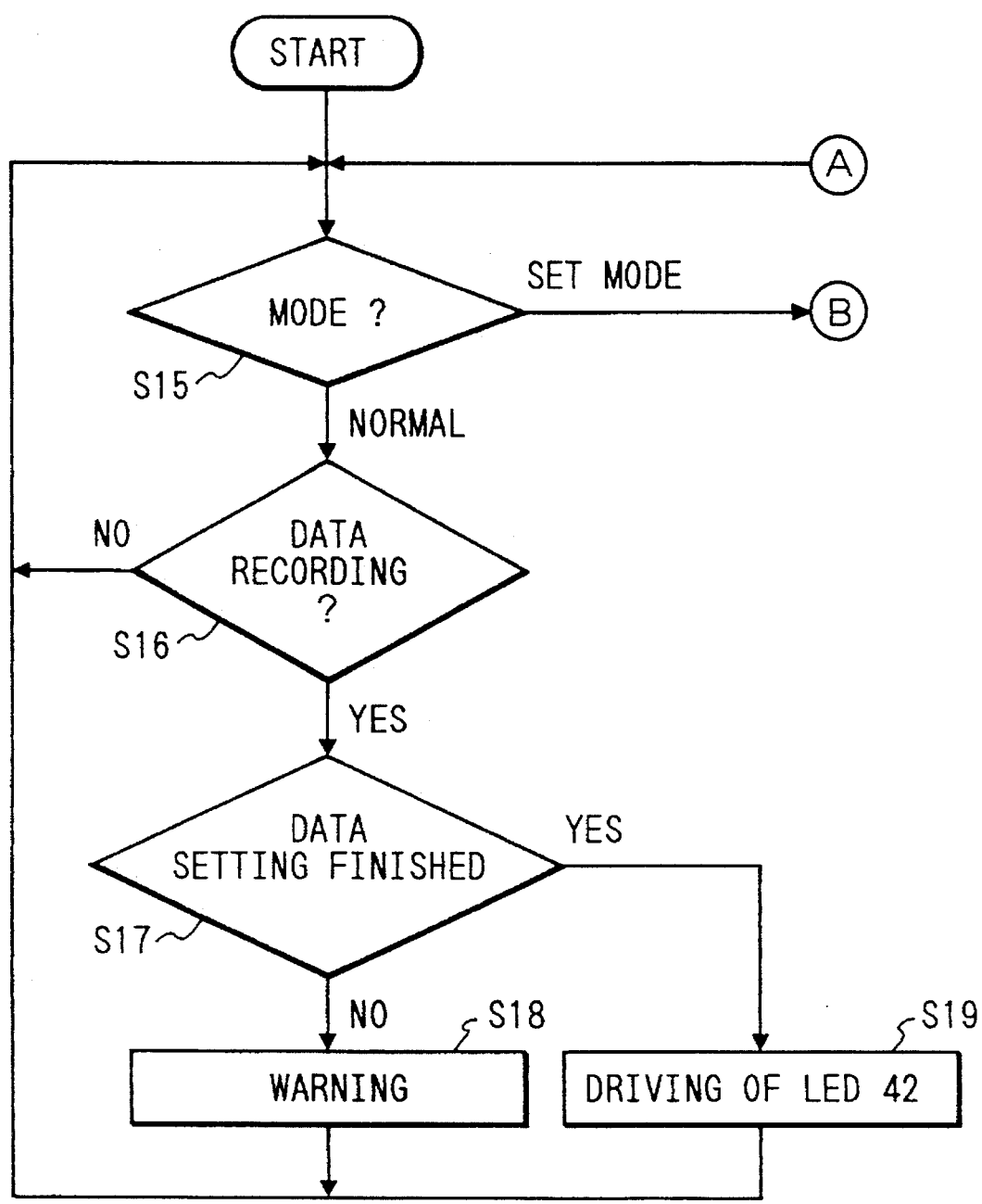
FIG. 7 is a flowchart showing a processing routine by a CPU of the databack.
Figure 8:
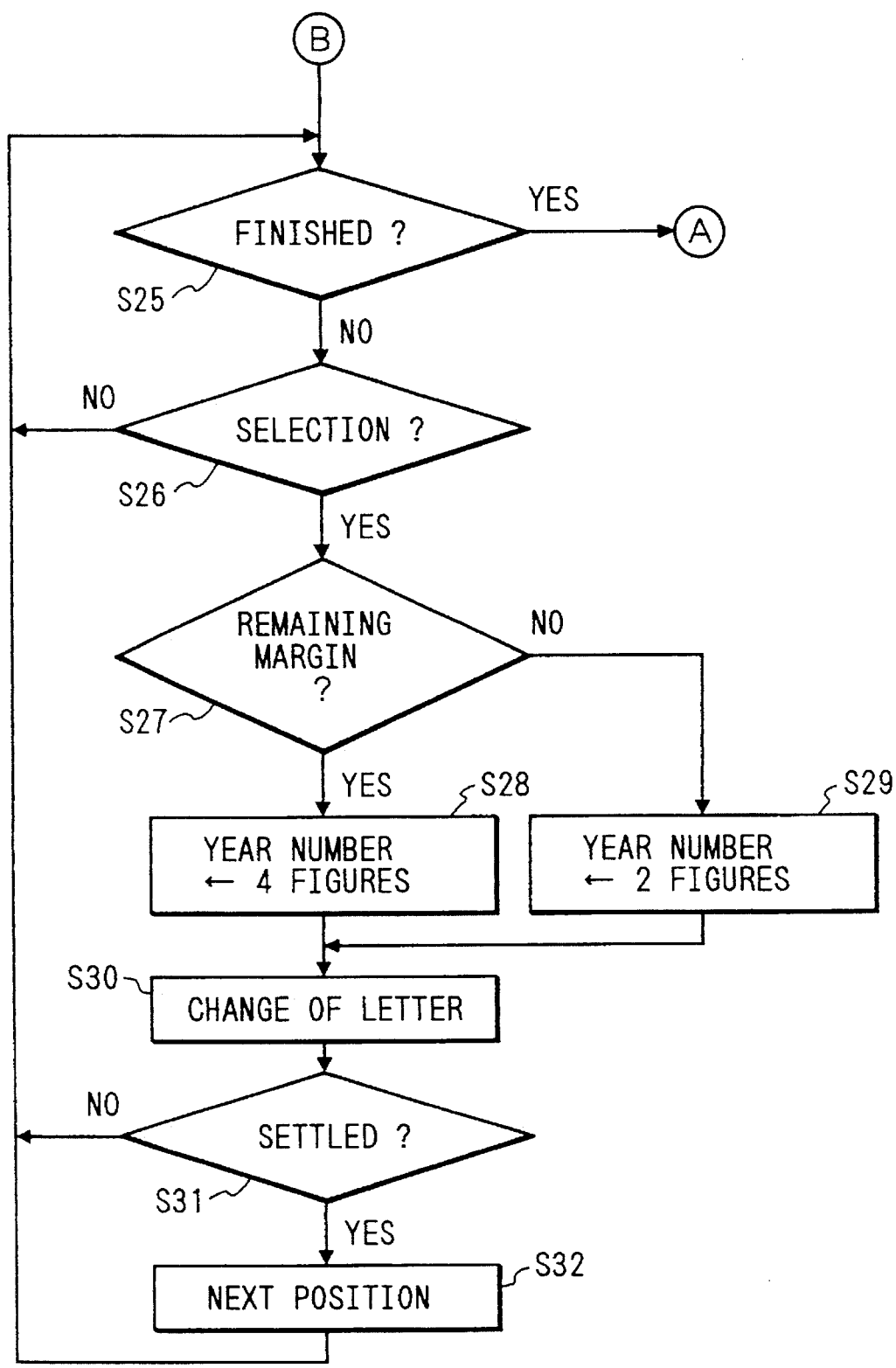
FIG. 8 is a flowchart showing a processing routine by the CPU of the databack.

FIGS. 7 and 8 show an example of a processing routine by the CPU 36 in the databack 5 shown in FIG. 3.

This routine is repeatedly executed during a supply of electricity to the CPU 36. For simplifying the explanation, however, there will be omitted a discussion on the calendar function to renew the year number by counting the outputs of the oscillator 44.

Note that the databack 5 is, it is assumed, provided with four buttons, i.e., a setting start button, a setting close button, a letter selection button and a letter determining button as the manipulation buttons 8 for registering the name.

Applications of these buttons will be, though known well, briefly given as follows.

When depressing the setting start button, the action enters a name registration process. At the first onset, a letter of the first figure is flicker-displayed starting from "A". All the registered names set before this time are deleted, and resetting can be executed from the beginning.

When depressing the end-of-setting button, the action exits the name registering process and goes back to the normal process. The end-of-setting button is active even in the midst of setting the name by depressing the letter selecting and determining buttons which will be mentioned later. The action can be returned to the normal mode any time. The display letters flickered are thereby brought into a light-up state.

When pushing down the letter selection button, the letters flickered are sequentially changed in such a manner that "B" is displayed subsequently to "A".

When depressing the letter determining button, the flickered letters are lit up and thus settled. If the letter of the next figure is to be set, "A" of the next figure is flicker-displayed by pushing down the letter selection button thereafter.

Note that the data on the year number is automatically recorded in the data recording action.

S15; Judge the present action mode. It is possible to judge whether the present action mode is a normal mode or not by checking whether or not the setting start button is depressed. If not depressed, the mode is judged to be the normal mode, and the action moves to S16.

S16; Judge whether or not the data recording signal is inputted from the camera 1 by monitoring the contact point 30. If not inputted, the action returns to S15.

S17; Judge whether or not the setting operation of the data is completed. This can be judged from the fact that the registration of the name is finished with the depression of the end-of-setting button described above.

S18; Warning that the copyright is incomplete, because the setting operation, i.e., the name registration, is not completed.

S19; Light up the LED array 42 according to the registered segments, because of the copyright registration being completed with the depression of the end-of-setting button. Record the data on the film.

S25; Judge whether or not the setting mode is finished by knowing whether the setting button is depressed or not. If finished, the action returns to S15, wherein the processes described above are repeated.

S26; Judge whether or not the letter selection button is pushed down. If not, the action returns to S25, wherein the processes mentioned above are repeated.

S27; Judge whether or not there exists a remaining margin for setting the letter, i.e., a next figure because of the letter selection button being pushed down.

S28; Set the year number in the 4-figure display because of having the letter setting margin in the next figure.

S29; Prepare a margin by setting the year number in the 2-figure display on account of having no letter setting margin in the next figure.

S30; Renew the letter of the relevant figure in response to the letter selection button depressed in S26.

S31; Judge whether or not the letter determining button is pushed down. If not, the action returns to S25, wherein the processes described above are repeated.

S32; Set up the flickered letters in the light-up state with the depression of the letter determining button. Repeat the processes from S25.

Incidentally, the display of the year number is determined by confirming the letter margin in the next figure in S28. It is required that the letter margin once prepared when setting the year number in the 2-figure display be not conceived as an original margin. Hence, for instance, the process after setting the year number in the 2-figure display continues as below. The setting start button is depressed after exiting the setting mode through the setting close button. The 2-figure display for the year number continues till a return to the initial value is conducted.

[S29→S30→S31→S32→S25→S26→S27→S28]

Figure 9A:
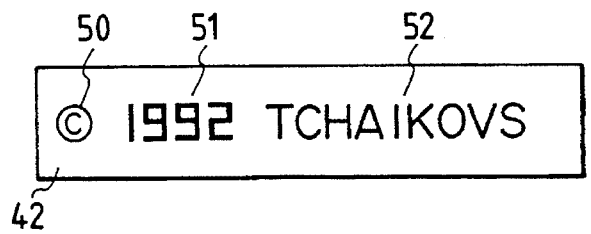
FIGS. 9A and 9B are diagrams showing a segment display mode in a second embodiment.
Figure 9B:
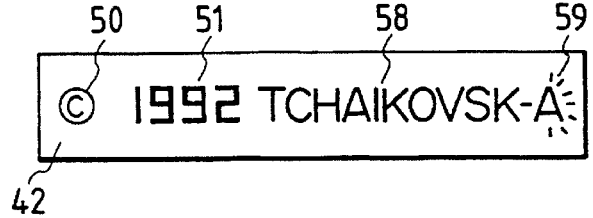

FIGS. 9A and 9B illustrate a second embodiment of the present invention. If the number of set figures does not exceed a predetermined number, the letters are displayed in a so-called full size in terms of width (full width). If over the predetermined number, all the letters including the figures set so far are change-displayed in a so-called half size in terms of width (half width).

FIG. 9A shows, as similar to FIG. 5A, a display state just before reaching the predetermined number of figures. The letters are displayed with the full width so far, and, therefore, it is possible to exhibit such a merit that the letter size is large enough to readily visually recognize the letter even on the film undergoing the record through the LED array 43 as well as on the segment 52 of the LCD 42.

FIG. 9B shows an example of display immediately after trying to set the letter to a predetermined value or larger. In this example, the segment 58 set so far is changed over to the half width, and a new blank segment 59 is produced.

The second embodiment exhibits such an effect that the number of the figures settable is, though a visual recognizability in the half-width letter becomes smaller than in the full-width letter, doubled enough to enable the accurate name to be set.

Note that a mark [©] is employed as a symbol mark of the copyright in the first and second embodiments. However, "COPYRIGHT" or "CPRT" may be Usable in terms of rules and regulations. This full display is applied to the present invention. If the number of figures is small, the display is changed when the name has a predetermined or greater number of figures by using the full display described above. It is thus possible to apparently increase the possible number of figures for the name. Only two figures can be produced out in the omission of the year number display described in the embodiments discussed above. According to this embodiment, however, eight figures can be displayed.

Note that the LED array has been shown by way of an example in the embodiments described above. The effect is, however, the same by such a method that the LCD may be used to display the letter without being limited to this LED array, and a lamp is lit up from the opposite side to project the light.

Incidentally, the setting operation, i.e., the name registration, is not yet completed in S18. Given therefore is a warning that the copyright is incomplete. Simultaneously, the in-process copyright data recording is prevented in that case. In the embodiment working as described above, however, even the in-process copyright data recording may be effected.

Next, a third embodiment will be explained with reference to the drawings. Note that the same elements as those (marked with the numerals, 101–107, 110–112, 114, the low-order two figures of which are the same in FIGS. 10 and 11) in the first and second embodiments will be omitted in their explanations.

Figure 10:
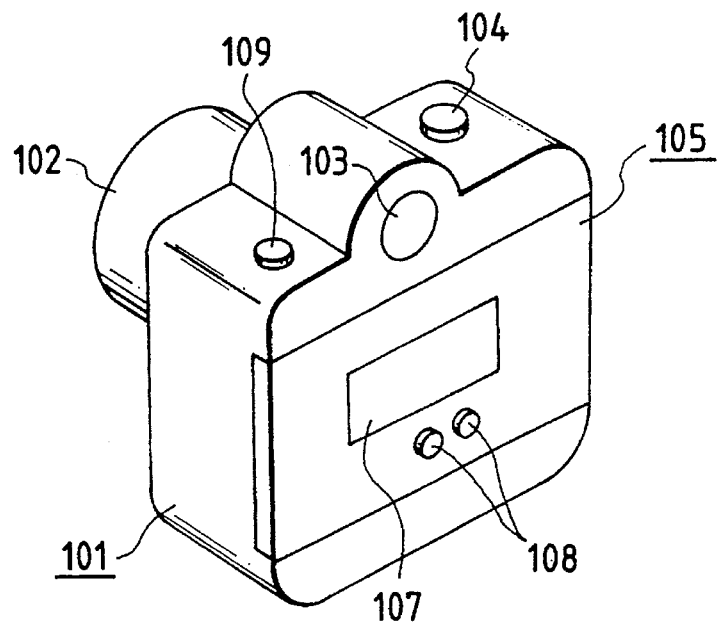
FIG. 10 is a sketch diagram illustrating a different information recording apparatus of a camera from that of FIG. 1.

FIG. 10 is a perspective view showing one embodiment of an information recording apparatus of a camera. A variety of modes and photographing conditions can be set by manipulating a plurality of mode setting buttons 108 while seeing an LCD 107 provided on a rear cover 105. As will be mentioned later, the button 108 is also used for selecting the data recorded on the unillustrated film. When finishing the photography, the rewind button 109 is pushed down, whereby the built-in motor rotates. The film drawn out is loaded into the cartridge (not shown).

Figure 11:
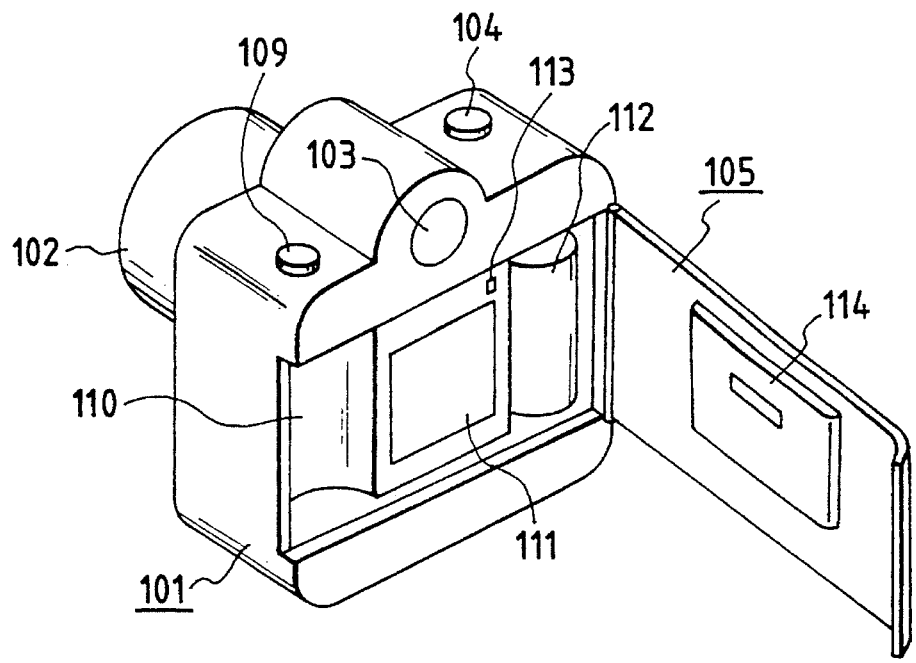
FIG. 11 is a sketch diagram illustrating a state where a rear cover of the camera shown in FIG. 10 is opened.

FIG. 11 is a perspective view illustrating a state where the rear cover 105 of FIG. 10 is opened.

An LED array 132 (shown in FIG. 12) is defined as a data recording LED array provided upwardly of an aperture 111, wherein LEDs for seven dots are arranged in the vertical direction. When winding or rewinding the unillustrated film, each dot of the LED array 17 is flicker-controlled while monitoring a moving quantity thereof. The set data are recorded in predetermined positions on the film. In the case of the seven dots extending in the vertical direction, it is generally required that the LED for five dots arranged sideways be flicker-controlled to express the alphanumeric characters.

Figure 12:
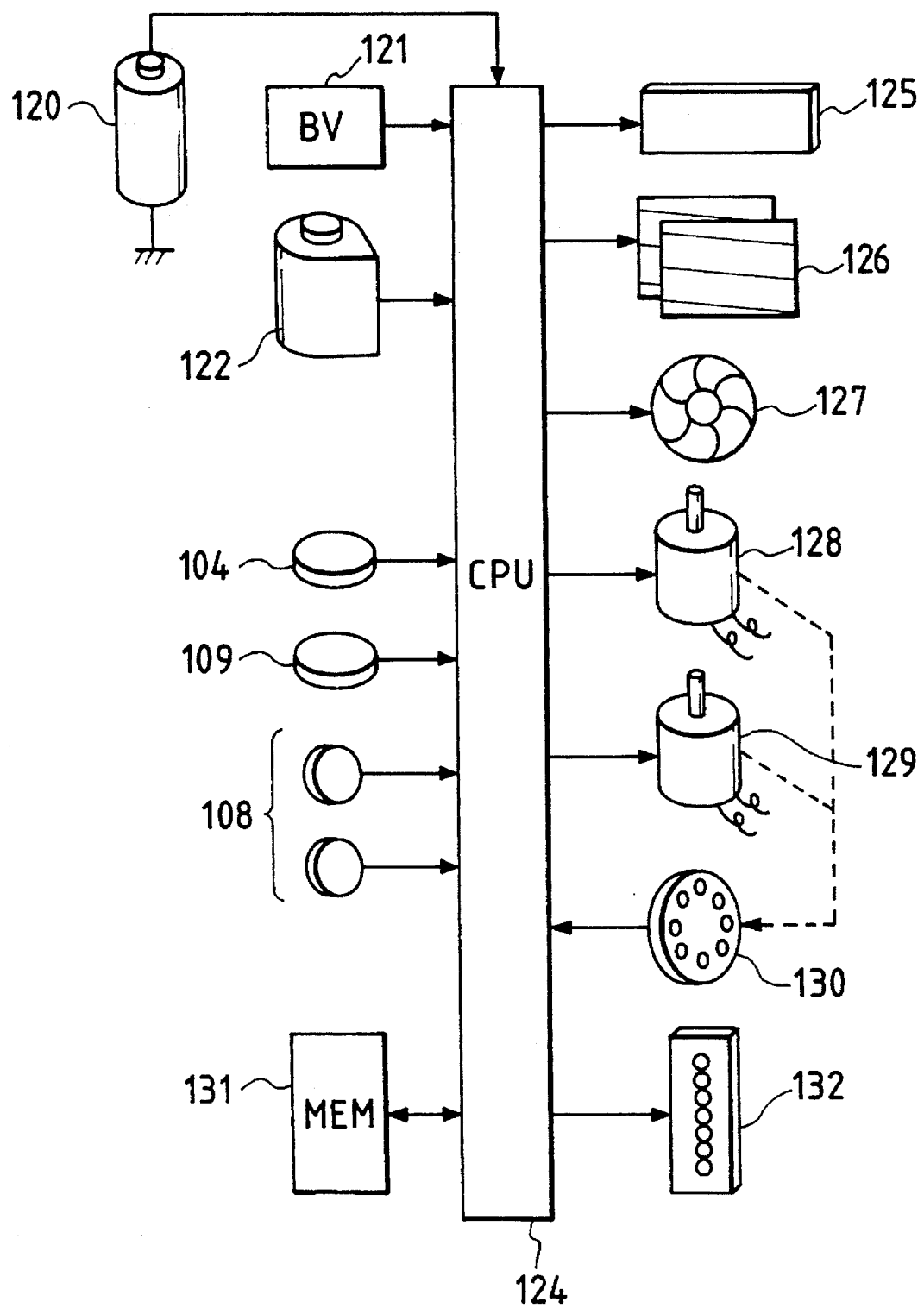
FIG. 12 is a block diagram showing a connection of the information recording apparatus shown in FIG. 10.

FIG. 12 is a block connection diagram of the camera 1 according to the present invention. The explanations of the same elements (marked with the numerals 120–122, 125–127 in FIG. 12) as those in FIG. 3 will be omitted.

Supplied to a CPU 124 are a subject luminance signal from a photometric circuit 121, a film sensitivity signal from a film sensitivity detection circuit 122 and a start-of-exposure signal through a shutter button 104. The CPU 124 is also supplied with a film rewind start signal from a rewind button 109, a variety of mode setting signals from mode setting buttons 108 and a film feed quantity detection signal from an encoder 130.

The CPU 124 performs, in the form of outputs thereof, displaying of exposure conditions or recording data through the LCD 125 and an exposure for a duration of a predetermined time by opening and closing the shutter 126. The CPU 124 also regulates the quantity of transmitted light by making variable an aperture diameter of the stop 127. The CPU 124 controls film winding by rotating the wind motor 128 and the mechanism energizing of a shutter, etc.. The CPU 124 further controls film rewinding by rotating the rewind motor 129 and performs flicker-control of the LED array 132.

A memory circuit 131 is a non-volatile memory for storing the recording data. The storage data are read as the necessity arises. As will be mentioned later, the normal data such as a year, a month and a date continue to be stored till rewinding is executed.

An encoder 130 works, as explained earlier, to output the film feed quantity detection signal. The wind motor 128 or the rewind motor 129 is rotated, and the film is thereby wound up or rewound. On this occasion, the encoder 130 rotates in accordance with the feed of the film, and a pulse signal is transmitted to the CPU 124. The pulse signal to be transmitted is designed to enable the detection of a microfeed of the film. The encoder 130 is therefore employed as a source of timing signals to control the flickering of crosswise 5 dots per letter on the LED array 132.

Herein, a relationship between the pulses generated by the encoder 130 and the flicker of the LED array 132 will be explained with reference to FIGS. 13A–13C. Given herein is an example where "5" is recorded in the first figure.

When both of the motors 128 and 129 are switched off, i.e., at a timing T50, the LED 132 consisting of vertical seven dots is, as indicated by the white circles, in an extinguished state. Thereafter, when the motor 128 or 129 is switched ON, viz., makes rotations to start the feed of the film, the encoder 130 generates the pulses interlocking therewith.

When detecting the first pulse-generation, the LED array 132 emits the light with respect to only the black-circled portions at a timing T51. The white circle, as in the previous case, indicates the extinguished state. At the second, third and fourth pulse-generations subsequent thereto, the flickering state is changed as shown by timings T52, T53, T54. Further at the fifth pulse-generation, the flickering state is changed as shown by a timing T55.

As explained above, each time the encoder 130 generates the pulse, the flickering state of the LED array 132 is changed. The record of the alphanumeric character is thereby executed. Thereafter, the alphanumeric character of the next figure is recorded at a proper interval.

Figure 14:
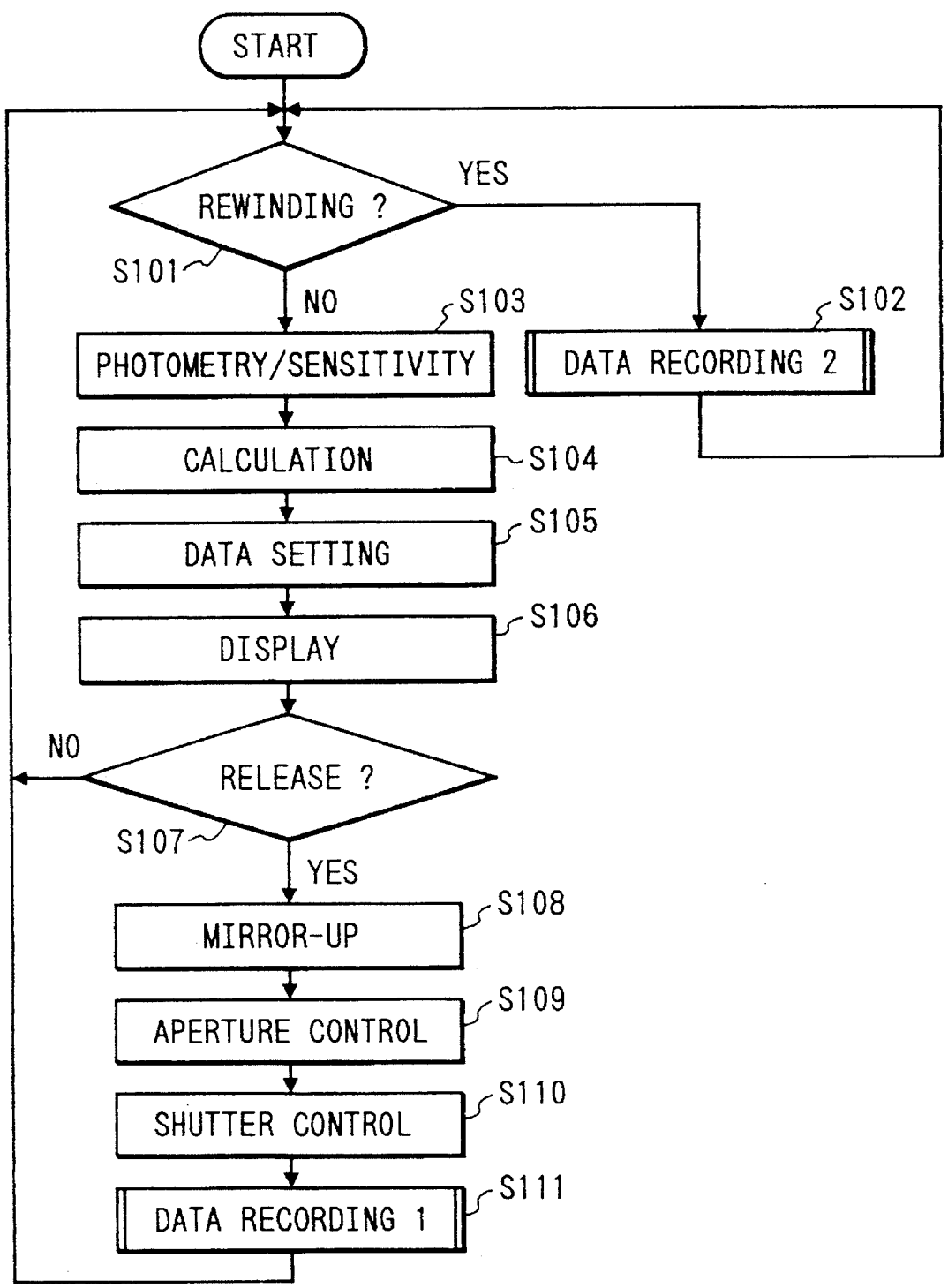
FIG. 14 is a flowchart of the CPU of the information recording apparatus.

FIG. 14 shows an example of a processing routine by the CPU 124 within the camera 1 shown in FIG. 12. This routine is repeatedly executed during a supply of electricity to the CPU 124.

In step S101, it is judged whether or not film rewinding with a depression of the rewind button 109 is commanded. When pushing down the rewind button 109, a second data recording routine in step S102 is executed. Step S102 is the second data recording routine for recording the data while rewinding the film. Details thereof will be hereinafter stated referring to FIG. 16.

In step S103, there are taken in the photometric and sensitivity signals from the photometric circuit 121 and the sensitivity detecting circuit 122.

In step S104, a shutter speed and an f-number that are defined as proper exposure conditions are calculated by a calculation about the two signals.

In step S105, a photographing mode or a data recording mode is determined by monitoring statuses of the mode setting buttons 108. The recording data set at this time are temporarily stored in a RAM of the CPU 124.

In step S106, the exposure conditions obtained in step S104, the photographing mode set in step S105 and the recording data are displayed on the LCD 107.

Judged in step S107 is whether or not an execution of the release routine with a depression of the shutter button 104 is commanded. If the shutter button 104 is not pushed down, the action returns to step S101, wherein the processes described above are repeated.

In step S108, if pushed down, to start with, the unillustrated reflecting mirror is raised off the photographing path.

In step S109, the stop 127 is adjusted to a predetermined stop aperture.

In step S110, the shutter 126 is opened and closed to regulate the exposure on the film.

In step S111, the exposure is completed, and, hence, there is executed the first data recording routine in which the data are recorded while winding up the film. Note that details of the first data recording routine will be stated later with reference to FIG. 15. One cycle of the exposing actions is thus completed, and the action therefore returns to step S101 to repeat the above-mentioned processes.

Figure 15:
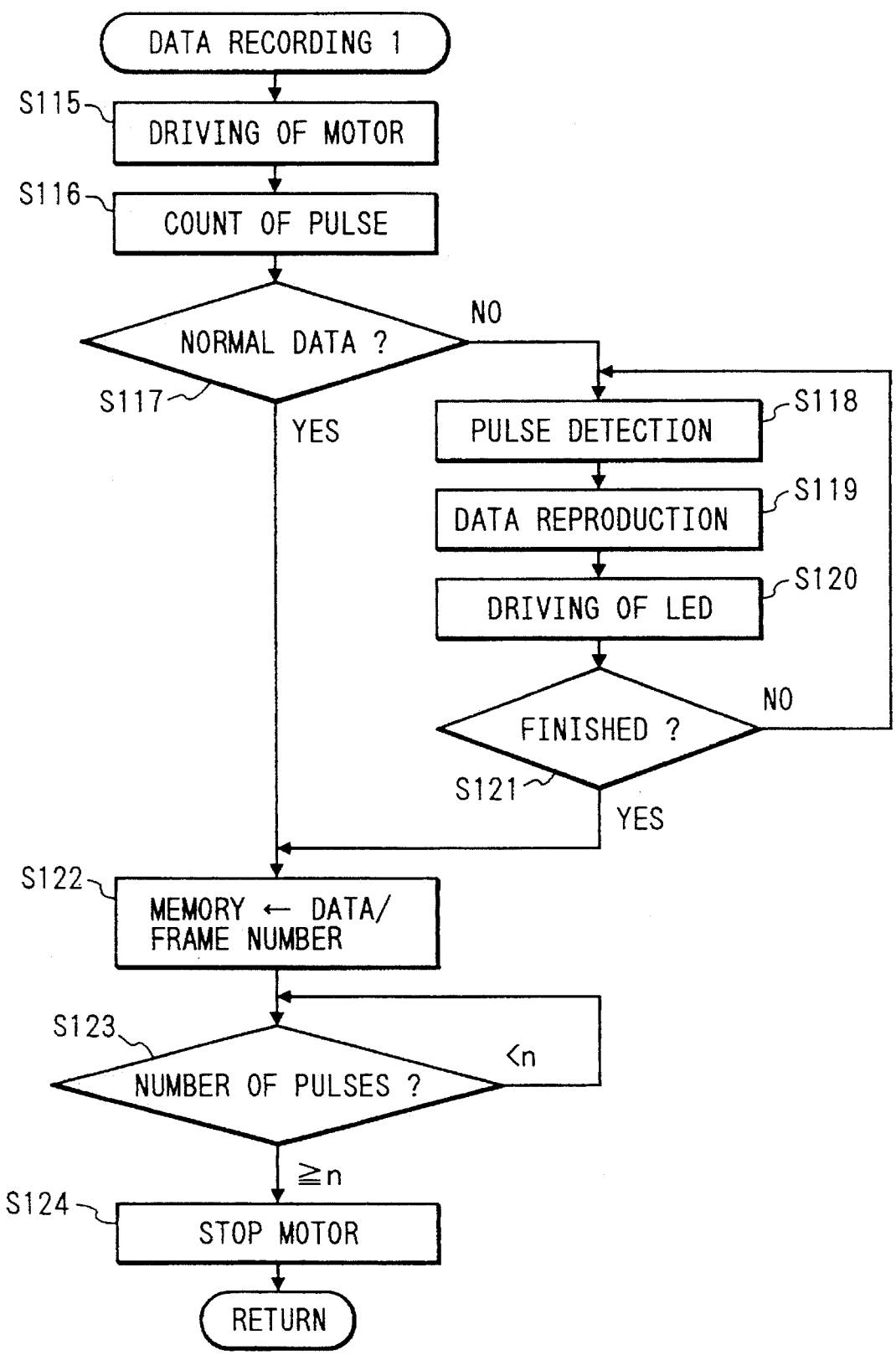
FIG. 15 is a flowchart of the CPU of the information recording apparatus.

FIG. 15 illustrates the details of the first data recording routine shown in step S111 of FIG. 14.

This routine presents such a method that the recording data on the year, month and data are normally stored in a memory circuit 131, while the copyright data are recorded with a feed of the film on that occasion.

In step S115, the rewinding motor 128 starts rotating. A wind quantity per frame of the film is known from the number of pulses of the encoder 130 rotating interlocking with the feed of the film. Hence, counting the number of pulses is started in step S116. The number of pulses counted herein is, as will be mentioned below, employed also for rewinding the film.

Judged in step S17 is whether the recording data relative to the present film frame, i.e., the recording data set in step S106 of FIG. 14, are the normal data on the year, month and date or associated with the copyright display. In the case of the normal data, the action skips steps S118 through S121, but there is executed the recording of the data on the film in a rewind routine which will hereinafter be explained. In the case of the copyright display, the film winding is started in step S115, and hence the pulse-generation from the encoder 130 interlocking with the feed of the film is detected in step S118.

The recording data set in S105 and stored in the RAM of the CPU 124 are read in step S119.

The recording data are changed in the flickering state corresponding to the vertical seven dots of the LED array 132 in step S120.

Whether or not the data record corresponding to the set figures is completed is judged in step S121. If not completed, the processes from step S118 are repeated.

In step S122, if judged to be the normal data in step S117, the data to be recorded that are temporarily stored in the RAM of the CPU 124 are transferred as a combination with the frame number to the memory circuit 131.

If not judged to be the normal data in step S117, the data have been already recorded in steps S118 through S121, and, therefore, the data indicating the completion of the data record are stored as a combination with the frame number in the memory circuit 131. Simultaneously, the recording data stored in the RAM of the CPU 124 become unnecessary and are therefore vacated.

In step S123, there is a wait till the number of pulses given from the encoder 130 continuing to count from step S116 reaches a value corresponding to one frame of the film. In step S124, the one-frame feed of the film is completed, and hence the action goes back to step S101 of FIG. 14 by stopping the wind motor 128.

Figure 16:
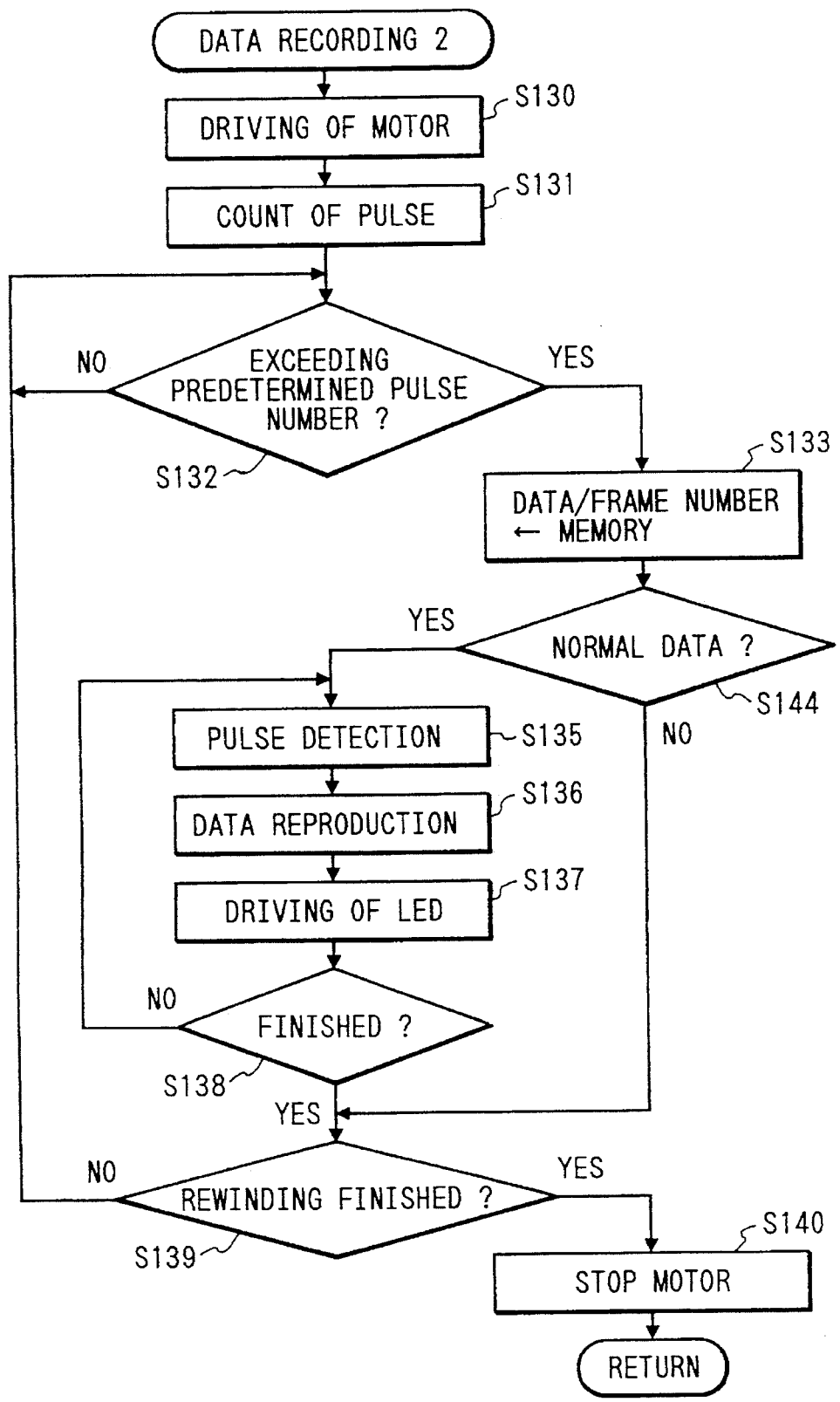
FIG. 16 is a flowchart of the CPU of the information recording apparatus.

FIG. 16 illustrates details of the second data recording routine shown in step S102 of FIG. 14.

This routine presents a method wherein the normal data on the year, month and date that are simply stored in the memory circuit 131 are, as explained referring to FIG. 15, recorded on the film while rewinding the film. Note that at this time the copyright data have already been recorded on the film when wound up. Accordingly, only the rewinding process is performed without recording the data on that frame.

When the routine is started, the rewind motor 129 starts rotating in step S130. One-frame and all the film rewinding quantities are known from the number of pulses of the encoder 130 rotating interlocking with the feed of the film. The count of the number of pulses is started in step S131.

In step S132, there is a wait till the pulse number corresponding to the one-frame film feed is reached.

An elapse of the pulse number corresponding to the one-frame film feed implies that the film is rewound by one frame. The data on the relevant frame that have been stored in the memory circuit 131 are read therefrom in step S133.

Whether or not the normal data on the year, month and date are stored is judged from the above-mentioned frame data in step S134. If the normal data are stored, the action moves to step S135.

Whereas if judged not to be the normal data, i.e., if the above-described frame data stored in the memory circuit 131 are the copyright data, as explained referring to FIG. 15, it can be known that the data record has already been completed. The action therefore skips the processes from step S135 over to step S139 which will be stated later.

In step S135, since the film rewinding is started in step S130, there is detected the pulse generation from the encoder 130 interlocking with the film feed.

The ordinary recording data set in step S105 and stored in the RAM of the CPU 124 are read in step S105.

In step S137, the recording data are changed in the flickering state corresponding to the vertical seven dots.

Whether or not the data record for the set figures is completed is judged in step S138. If not completed, the processes from step S135 are repeated.

In step S139, there is a wait till the number of pulses given from the encoder going on counting from step S131 reaches a value corresponding to all the frames of the film.

In step S140, the feed of all the frames of the film, i.e., the film winding, is completed. Hence, the rewind motor 129 is stopped, and the action goes back to step S101 of FIG. 14.

Note that the third embodiment has given the example where either the normal data or the copyright data are selectively recorded as the recording data for the frames. Both of the normal data and the copyright data may be, however, simultaneously selectable. In this case also, the copyright data may be recorded when photographed. Other normal data may also be recorded at the rewinding time with avoidance of the positions in which the copyright data have already been recorded.

Further, the LED array has been shown by way of an example in the third embodiment. The effect is the same with such a method that the LCD may be, as explained before, employed to display the letter, and the lamp is lit up from the opposite side to project the light.

Next, a fourth embodiment will be discussed with reference to the drawings. Note that the same elements as those (marked with the numerals having the low-order two figures in FIG. 1) in the first embodiment will be omitted in their explanations.

Figure 17:
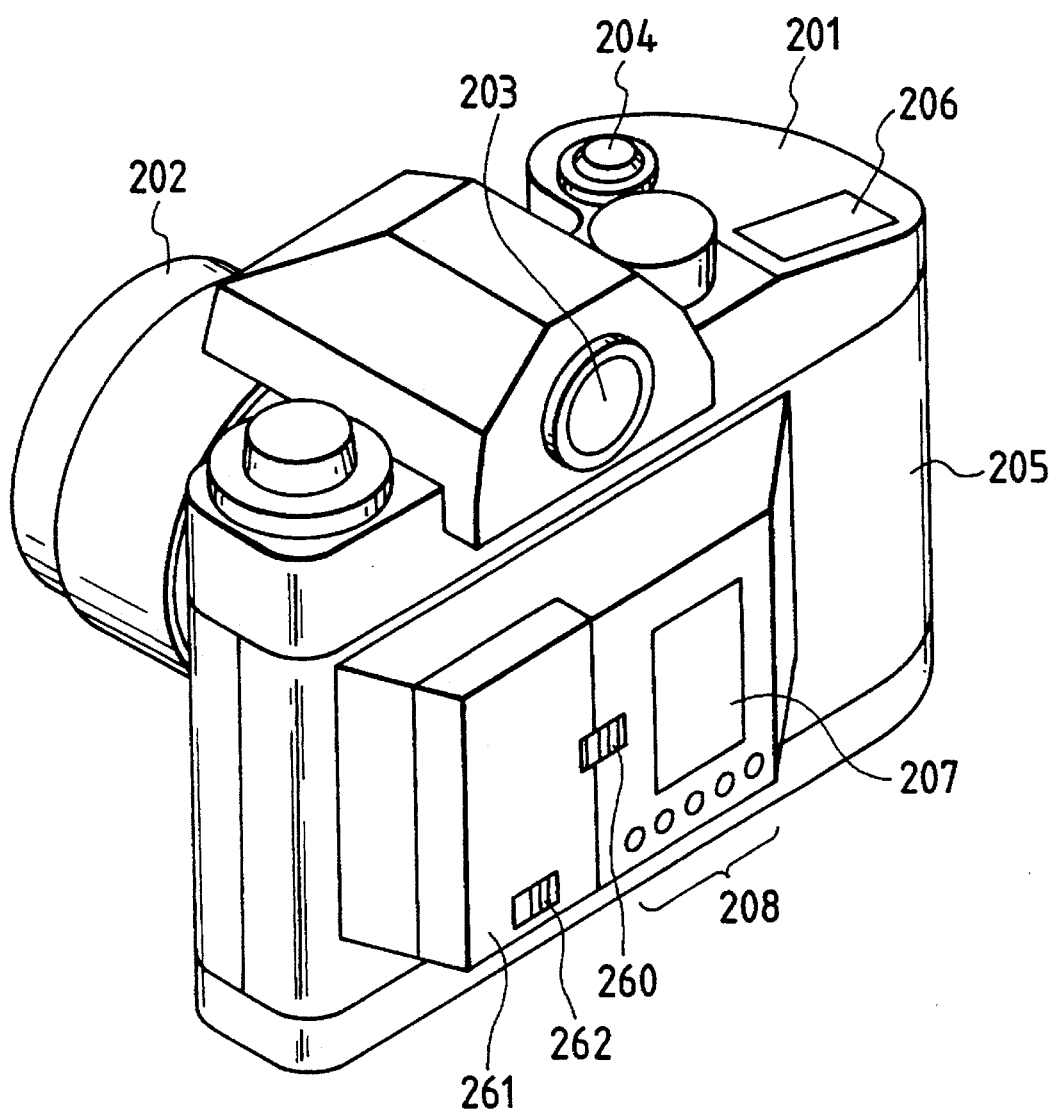
FIG. 17 is a sketch diagram illustrating a different information recording apparatus from that of FIG. 10.

FIG. 17 is a sketch diagram illustrating the camera mounted with an information recording apparatus. Referring to FIG. 17, a databack 205 includes a cover member 261 openable and closable by manipulation member 260. An on/off changeable card switch 262 is provided on the exterior of the cover member 261. As a group of manipulation buttons 208, there are prepared five buttons, viz., a setting start/end button, a function selection button, a numeric value modifying button and a data record/non-record change button. Applications thereof will be stated in detail when explaining a processing routine of FIG. 28.

Figure 18:
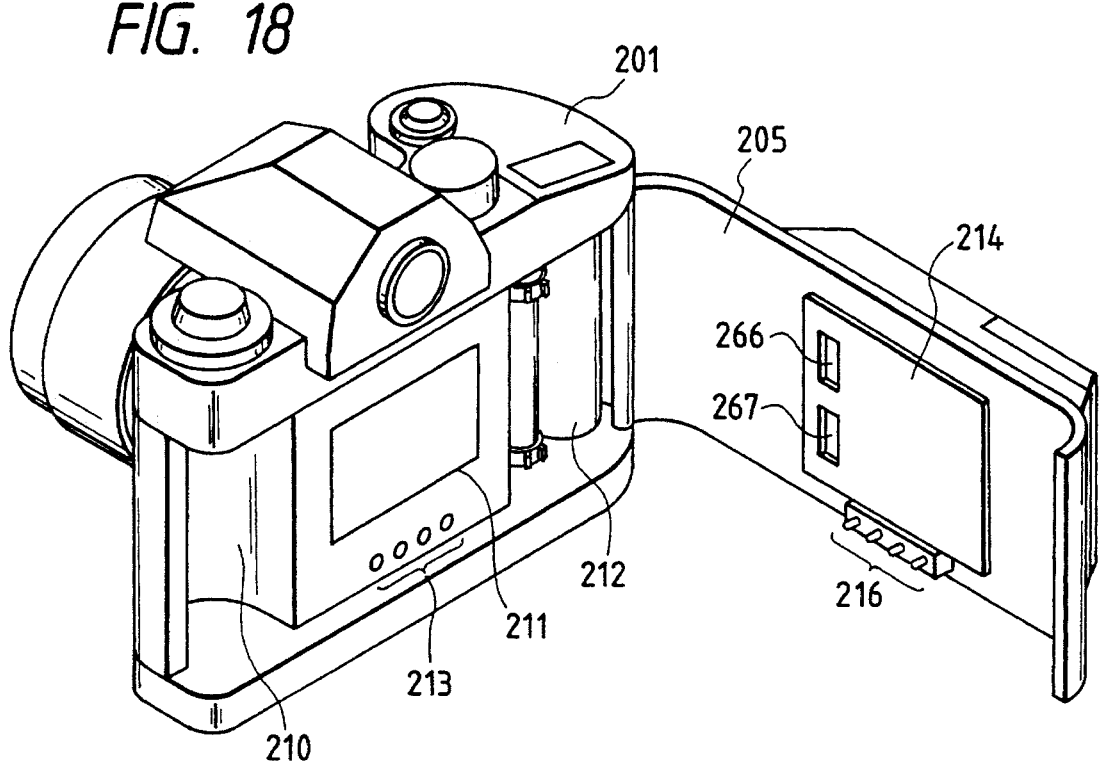
FIG. 18 is a sketch diagram showing a state where the rear cover of the camera of FIG. 17 is opened.

FIG. 18 is a perspective view illustrating a state where the databack 205 shown in FIG. 17 is opened. A presser plate 214 is formed with holes 266, 267 in two positions. The copyright data and time data that are to be recorded via these two holes are projected and optically recorded on the rear surface of the photographing film.

Figure 19:
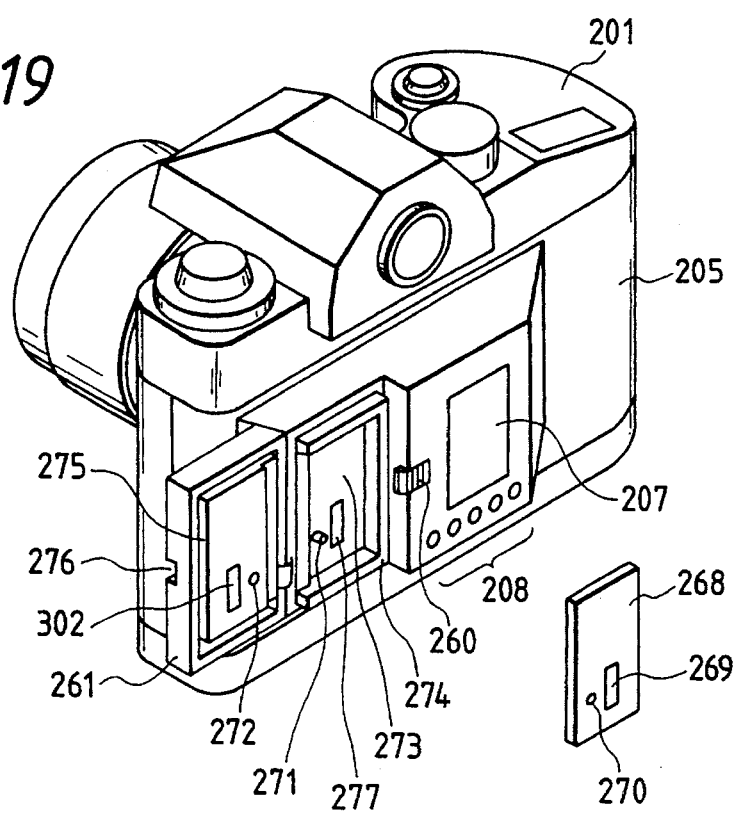
FIG. 19 is a perspective view illustrating the information recording apparatus.

FIG. 19 is a perspective view illustrating a state where the cover member 261 of the databack 205 of FIG. 17 is opened. A card 268 is formed with a mask portion 269 and a reference hole 270. The mask portion 269 is fitted with a masking plate which optically transmits only the letters to be recorded but does not transmit portions other than the letters. The cover member 261 is provided with an escape hole 272 and a diffusion plate 302. The databack 205 is provided with a loading portion 273 of the card 268. This loading portion 273 is surrounded with a wall 274. Further, a hole 277 is formed in a position corresponding to the mask portion 269 when the card 268 is loaded. A reference pin 271 fitted into the reference hole 270 is embedded into the loading portion 273.

The cover member 261 is formed with a groove 275 into which the wall 274 is fitted when closing the cover member 261. Besides, an engagement groove 276 is formed in such a position as to engage with an engagement member 260.

Figure 20:
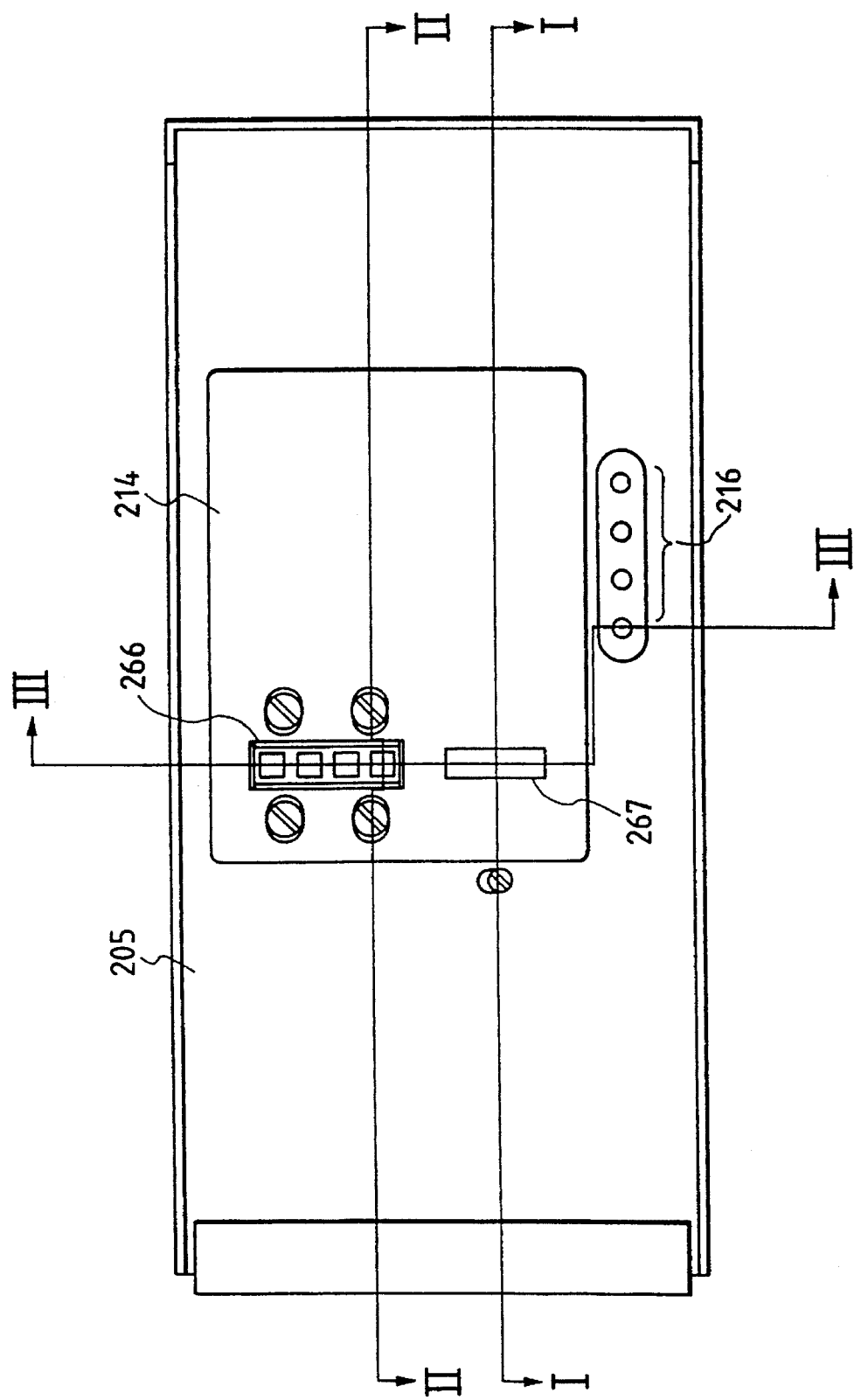
FIG. 20 is a front view depicting the information recording apparatus.

FIG. 20 is a plan view of the databack 205 demounted from the camera 201 as viewed from the side of the presser plate 214. Turning to FIG. 20, the presser plate 214 is placed on the databack 205. The presser plate 214 is formed with the holes 266, 267 described above. Further, a lower part of the presser part 214 is provided with a contact point 216 for transferring and receiving a data recording signal to command the databack 205 to record the data.

Figure 21:
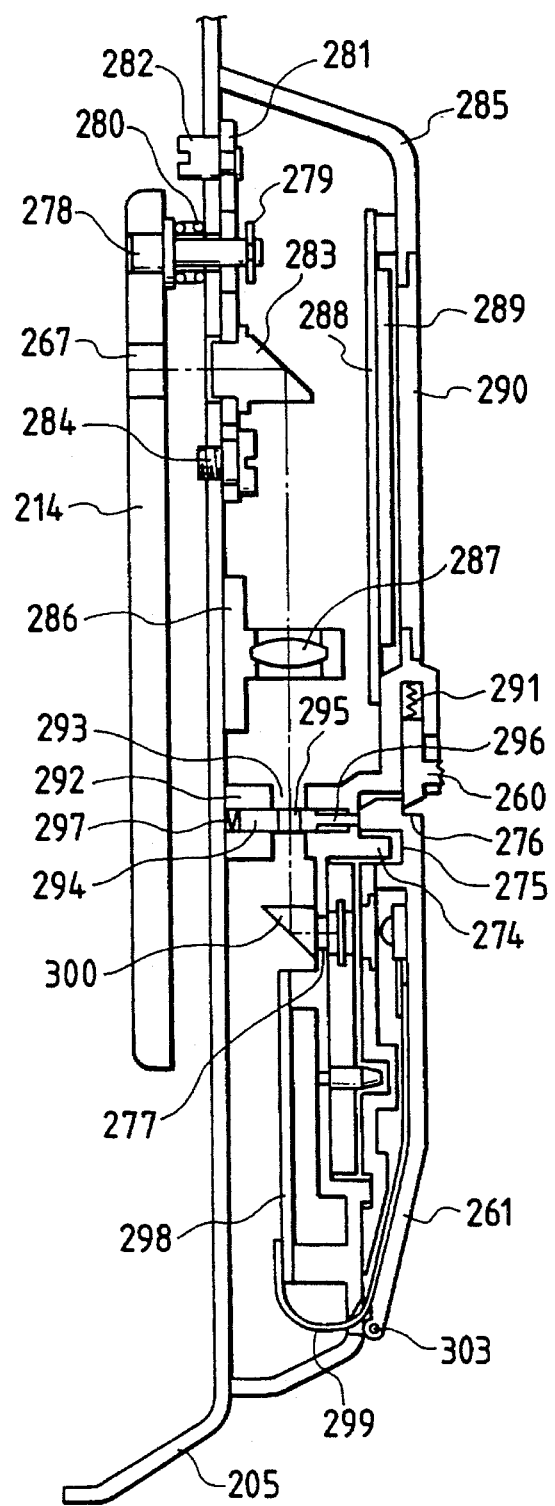
FIG. 21 is a sectional view depicting the information recording apparatus.
Figure 22:
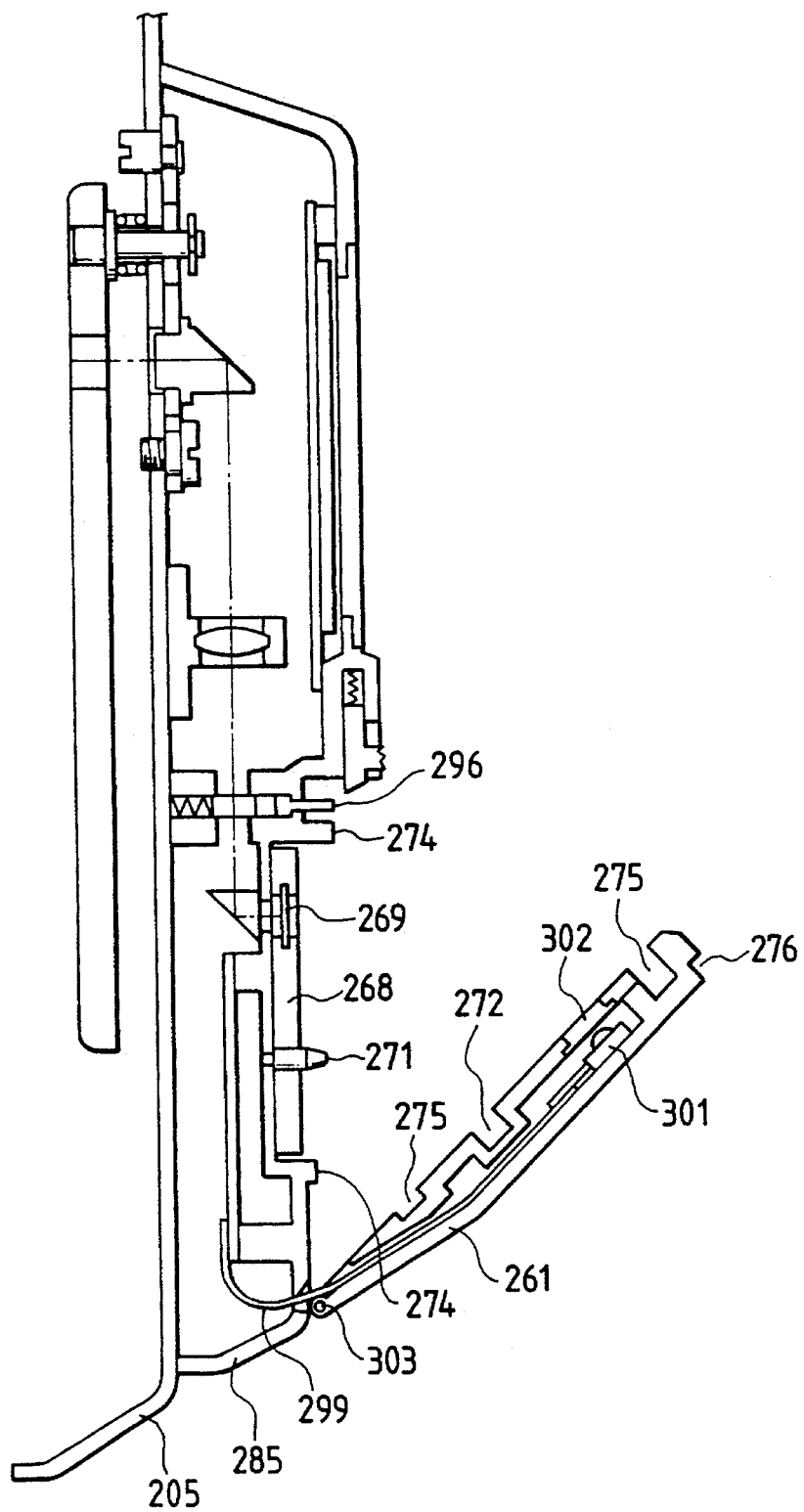
FIG. 22 is a sectional view illustrating the information recording apparatus.

FIGS. 21 and 22 are sectional views taken along the line I—I of FIG. 20. FIG. 21 illustrates a state where the cover member 261 is closed. FIG. 22 shows a state where the cover member 261 is opened.

Paying attention to FIGS. 21 and 22, a pin 278 is embedded into the rear surface (opposite to the photographing film contact surface) of the presser plate 214. A tip of the pin 278 is inserted into a hole of the databack body 205 but prevented from coming off with a securing ring 279. A spring 280 is interposed between the databack body 205 and the presser plate 214. The pin 278, the securing ring 279 and the spring 280 are depicted by ones in FIGS. 21 and 22 but actually provided by threes. More specifically, the presser plate 214 is elastically supported on the databack body 205. When closing the databack 205, the presser plate 214 serves as a base of position in the directions along the optical axis of the photographing film within the camera 201.

A display liquid crystal plate 289 is disposed on a circuit substrate 288, whereby the display can be confirmed through a transparent plate 290 mounted in a cover 285. An engagement member 260 incorporated into the cover 285 is biased toward the cover member 261 (lower part in FIG. 21) by means of a spring 291. Accordingly, the engagement member 260 engages with an engagement groove 276 when closing the cover member 261, thus keeping the closed state. The engagement member 260 is moved upward in the Figure, resisting the spring 291, and thus disengaged therefrom, and the cover member 261 is, as mentioned before, brought into the open state. Note that an LED control substrate 298 is fixed to the cover 285 and connected to an electric parts on the side of the cover member 261 via a flexible printed circuit board (FPC) 299 exhibiting a flexibility.

A prism holding plate 281 is installed in the interior of the cover 285. An eccentric pin 282 and a right-angle prism 283 are provided on the spring holding plate 281. The pin 282 and the prism 283 are fixedly held on the prism holding plate 281 by stepped screws 284. A structure of these portions will be described in greater detail with reference to a plan view of FIG. 24. A lens mount 286 for holding the lens 287 is fixed to the databack body 205. Note that a right-angle prism 300 having a face-to-face relationship with the right-angle prism 283 is installed in a position of the hole 277 of the cover 285. The cover 281 is provided with a wall 292 for partitioning a section on the side of the circuit substrate 288 from a section on the side of the cover member 261. The wall 292 is formed with a hole 293. Further, a shutter plate 294 is incorporated into the interior of the wall 292. The shutter plate 294 is biased toward the cover member 261 (rightward in FIG. 21) by a spring 297. The shutter plate 294 is formed with a hole 295 having substantially the same diameter as that of the hole 293 of the wall 292. An edge 296 (right edge in FIG. 21) of the shutter plate 294 can be made to contact with the cover member 261. When the hole 295 becomes substantially concentric with the hole 293 when pushed by the cover member 261, a through-hole is formed. Further, when the edge 296 is not pushed by the cover member 261, no through-hole is formed. Therefore, the shutter plate 294 and the holes 295, 293 are combined to constitute a slide shutter.

Next, profiles of the cover member 261 and the card 268 will be explained in terms of structure with reference to FIG. 22. Turning to FIG. 22, the card 268 is provided with a mask portion 269 and a reference hole 270. Installed in the mask portion 269 is a masking plate which optically transmits a copyright mark and letters of a name of the copyright owner but does not transmit portions other than this mark and the letters. The reference hole 270 is, when loading the card 268, engaged with the reference pin 271, thus providing the base of position. The cover member 261 is formed with an escape hole 272 for permitting a protrusion of the reference pin 271 to escape.

A back light LED 301 is connected to an FPC 299. The mask portion 269 is irradiated with the diffused light via the diffusion plate 302. The cover member 261 is openable and closable at a hinge 303. The FPC 299 exhibits a flexibility, and the opening/closing actions are not therefore hindered. When the cover member 261 is closed, the wall 274 enters the groove 275. As stated before, a light intercepting characteristic is thus provided, and the engagement groove 276 is engaged with the engagement member 260.

Figure 23:
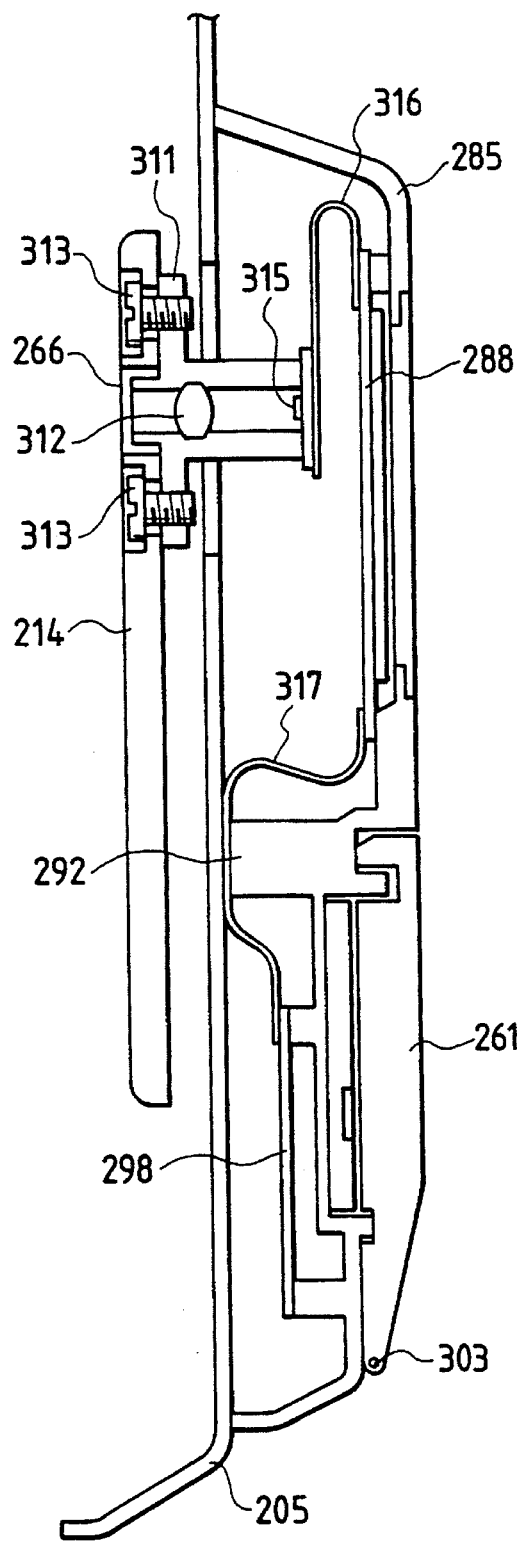
FIG. 23 is a sectional view illustrating the information recording apparatus.

FIG. 23 is a sectional view taken along the line II—II of FIG. 20. Paying attention to FIG. 23, a lens 312 is incorporated into a data recording block 311 fixed to the presser plate 214 with a screw 313. One end of the block 311 is fitted into the hole 266 of the presser plate 214, while the other end is fixed to an LED array substrate 315. Four pairs of 7-segment LEDs 315a, 315b, 315c, 315d are disposed on the LED array substrate 315 (see FIG. 24). When changing a light emitting mode of each pair of the 7-segment LEDs 315a–315d, an image thereof is formed through the lens 312 on the unillustrated photographing film closely fitted to the presser plate 214. An arbitrary numeral can be thereby shot-recorded. The LED array substrate 315 is electrically connected via an FPC 316 to the circuit substrate 288. The FPC 316 having a flexibility, and therefore no influence is exerted even when the presser plate 214 oscillates.

On the other hand, the circuit substrate 288 is also electrically connected via an FPC 317 to the LED control substrate 298. The FPC 317 is interposed between the wall 292 and the databack body 205. This arrangement is intended to maintain the light intercepting characteristic of the wall 292 between the cover member 261 and the circuit substrate 288.

FIG. 24 is a sectional view taken along the line III—III of FIG. 20. Referring to FIG. 24, as described above, the data recording block 311 is fixed to the presser plate 214. Four pairs of 7-segment LEDs 315a–315d and the lens 312 are installed. Two-figure numeric values and a decimal point can be shot-recorded through each pair of the 7-segment LEDs. Arbitrary numeric values of a total of eight figures can be recorded in the direction orthogonal to the film feeding direction. It follows that these numeric values are recorded in such a position as to be aligned with the data on the copyright through the right-angle prism 283 via the hole 267.

The respective contact points 216 (see FIGS. 18 and 24) undergo contact pressures from a spring group 318 when the databack 205 is mounted on the camera 201. The contact point 216 comes in contact with the contact point 213 (see FIGS. 18 and 24), whereby the signal can be transferred and received between the circuit substrate 288 and the camera 201. A manipulation button group 208 is provided adjacent to the circuit substrate 288. When depressed from outside, a conductive rubber 288a contacts the circuit substrate 288. An on/off switch is thus constructed.

FIG. 25 is an explanatory front view showing a method of attaching the data recording block 311 to the presser plate 214 and also a method of mounting the prism holding plate 281 on the databack body 205. FIG. 25 shows a state as viewed from the side of the presser plate 214 but is a fragmentary view illustrating, for an explanatory convenience, a part of the presser plate 214.

Turning to FIG. 25, the eccentric pin 282 embedded into the prism holding plate 281 is protruded from a slot 205a cut in the databack body 205. The prism holding plate 281 is secured by stepped screws 284 in three U-shaped grooves 281a. Consequently, with the rotations of the eccentric pin 282, the prism holding plate 281 is finely adjustable in the film-feeding directions (right-and-left directions in FIG. 25) with respect to the databack body 205. A projection position of the mask portion 269 can be thereby finely adjusted in the film-feeding directions with respect to the photographing picture.

Note that a distance from the lens 287 to an imaging plane is varied by this fine adjustment, and this may probably induce a defocus of the projected image. As a matter of fact, however, a trace of focus shifting quantity exists enough not to cause a problem at all. A hole 281b is also an escape hole for the pin 278 and the securing ring 279 as well.

The data recording block 311 is fixed to the presser plate 214 with four pieces of stepped screws 313. Four counterbores, for receiving the stepped screws 313, of the presser plate 214 are holes elongated in the film-feeding directions (right-and-left directions in FIG. 25). It is possible to adjust a position of the data recording block 311 with respect to the presser plate 214 by unfastening the four stepped screws 313. A numerical data shot-recording position with respect to the photographing picture can be also adjusted in the film-feeding directions.

Figure 26:
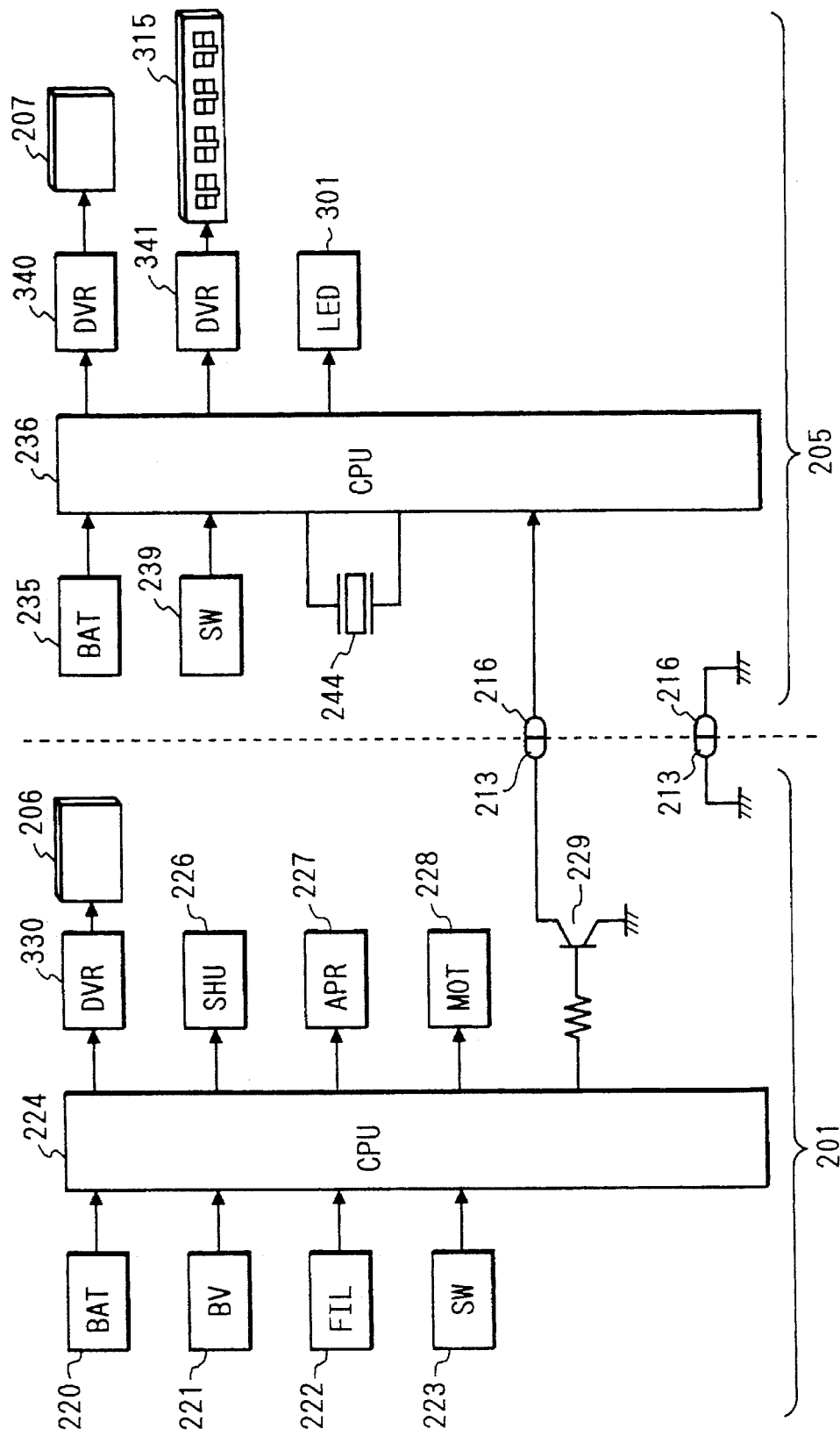
FIG. 26 is a block diagram showing a connection between the camera and the information recording apparatus.

FIG. 26 is a block connection diagram illustrating electronic circuits of the camera 201 and of the databack 205 in a fourth embodiment. A right-side section from the contact point 216 is the electronic circuit of the databack 205, while a left-side section from the contact point 213 is the electronic circuit of the camera 201. Note that the same elements (having the numerals the low-order two figures of which are the same in FIG. 3) as those in the first embodiment will be omitted in their explanations.

At the first onset, the electronic circuitry of the camera 201 will be described. A CPU 224 regulates the display of the exposure conditions by use of a liquid crystal display device 206 through a liquid crystal driver 330. The CPU 224 also regulates the exposure for a predetermined time by opening and closing a shutter 226 as well as regulating a quantity of transmitted light by adjusting an aperture diameter of a stop 227. The CPU 224 controls winding/rewinding of the photographing film by rotating a motor 228. The CPU 224 further outputs data recording signals to the databack 205 via the contact points 213, 216 by driving a transistor 229.

Next, the electronic circuit of the databack 205 will be explained. The electronic circuit of the databack 205 including a CPU 236 is supplied with the electricity from a battery 235. The CPU 236 causes a display device 207 to display the exposure conditions or the time and date through the liquid crystal driver 340. Further, the CPU 236 causes the respective segments of pairs of the 7-segment LEDs 315a–315d on the LED array substrate 315 to properly emit the light through an LED driver 341 in response to the data recording signal. Necessary numerical data are thus shot-recorded. At the same time, a back light LED 301 is flashed, thereby shot-recording the necessary copyright data.

Figure 27:
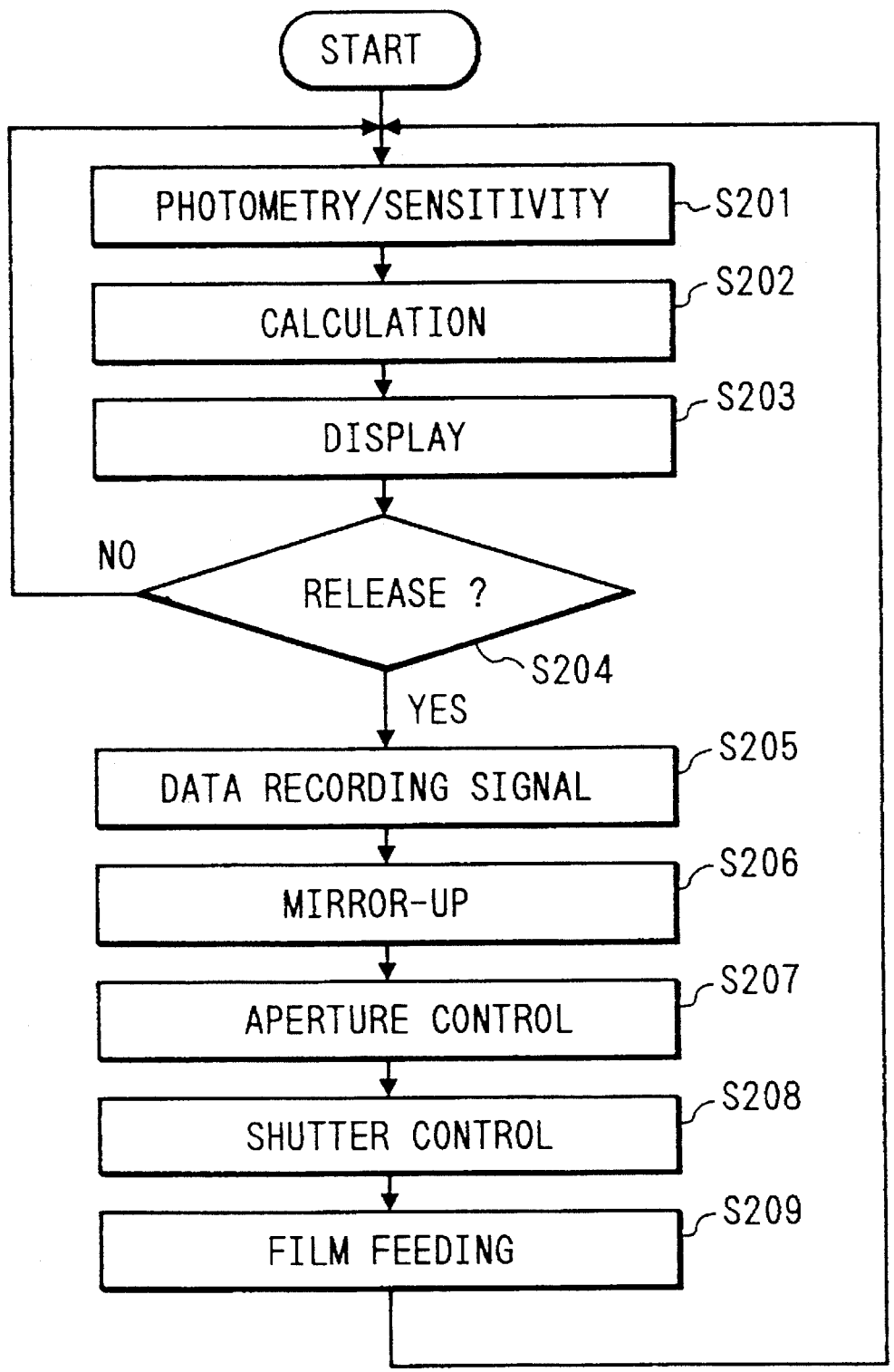
FIG. 27 is a flowchart showing processes by the CPU of the camera.

FIG. 27 is a flowchart showing a processing routine by the CPU 224 in the camera 201 illustrated in FIG. 26. This routine is repeatedly executed during a supply of the electricity to the CPU 224. An explanation thereof will be given as below.

When starting the routine, the photometric signal and the sensitivity signal are taken in from a photometric circuit 221 and a film sensitivity detection circuit 222 in step S201.

In step S202, a shutter speed and an f-number that are defined as proper exposure conditions are calculated by a calculation about the two signals.

In step S203, the thus obtained exposure conditions and a photographing mode set by a switch status detection circuit 223 are displayed on a liquid crystal display device 206.

In step S204, whether or not the shutter button 204 is depressed is judged through the switch status detection circuit 223. If not, the action returns to step S201, wherein the processes described above are repeated. Where if depressed, the action moves to step S205.

In step S205, the shutter button 204 is depressed, and hence the transistor 29 is turned on for a given time. The data are shot-recorded on the databack 205 through the contact points 216, 213.

In step S206, the unillustrated reflecting mirror is raised off the photographing light path.

In step S207, a stop 227 is adjusted to a predetermined stop aperture.

In step S208, the exposure on the photographing film is regulated by opening and closing the shutter 226.

In step S209, since the exposure has been completed, the motor 228 is caused to rotate forward, thereby feeding the photographing film and energizing the mechanism.

One cycle of the exposing actions is thus completed, and the action returns to step S201, wherein the processes stated above are repeated.

Figure 28:
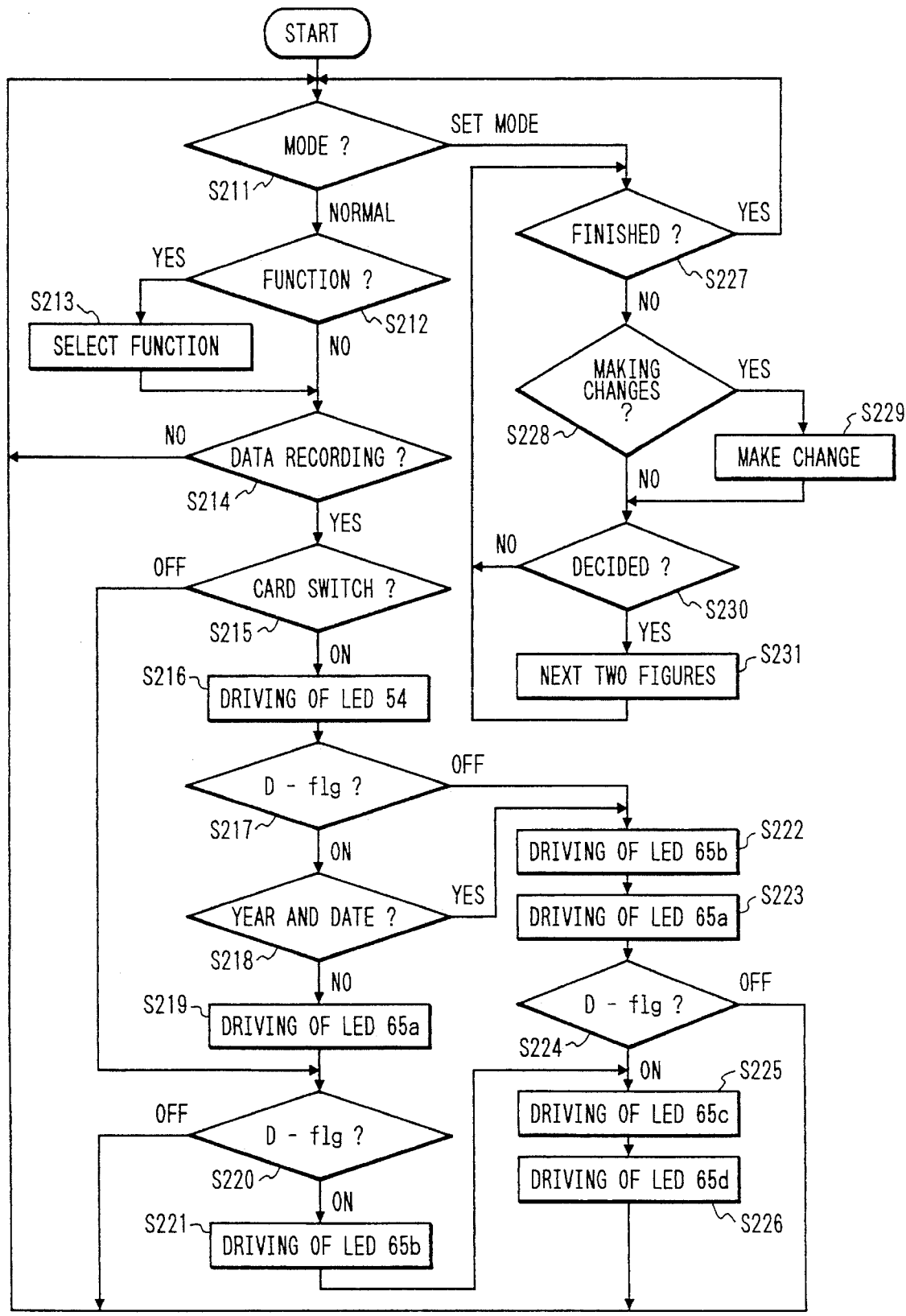
FIG. 28 is a flowchart showing processes of the information recording apparatus.

FIG. 28 is a flowchart showing a processing routine by the CPU 236 in the databack 205 illustrated in FIG. 26. This routine is executed during a supply of the electricity to the CPU 236. Note that there is omitted an explanation of a known calendar function to update the time data by counting outputs from an oscillator 244.

When the routine is started, the action in step S211 which operation mode is to be set at the present. If the setting start/end button is pushed down, the operation mode is judged to be a setting mode. The action then branches off into step S227 which will be stated later. If the setting start/end button is not pushed down, the operation mode is judged to be a normal mode, and the action moves to step S212.

In step S212, it is judged whether or not a function selecting button is depressed. There are six kinds of data recording functions of [Year/Month/Date], [Month/Date/Year], [Date/Month/Year], [Hour/Minute/Second], [Fixed Numeric Value] and [Up count Value]. Any one these functions is selectable. When the function selecting button is depressed, however, the action branches off into step S213. When not depressed, the action moves to step S214, with the present function remaining as it is.

In step S213, the function is updated. The six kinds of data recording functions given above are sequenced. The function selected at the present is changed to the next function. This sequencing action is endlessly conducted, and the first function is selected next to the last function. Accordingly, the photographer is capable of selecting a desired data recording function by depressing the function selecting button a predetermined number of times.

Whether or not the data recording signal is inputted from the camera 201 is judged in step S214 by monitoring the contact point 216. If not inputted, the action returns to step S211.

In step S215, a status of a card switch 262 is judged. If in an off-status, the action branches off into step S220. Whereas if in an on-status, the action moves to step S216.

In step S216, the back light LED 301 is flashed for a duration of a predetermined time in accordance with the film sensitivity information. Letters on the mask portion 269 are shot-recorded from the film rear surface.

In step S217, whether a data recording flag is set on (1) or off (0) is judged. If set on, the action moves to step S218. Whereas if set off, the action branches off into step S222. A method of setting and resetting the data recording flag will hereinafter be described.

Judged in step S218 is whether or not the presently selected data recording function is defined as the [Year/Month/Date] function. If defined as the [Year/Month/Date] function, the action branches off into step S222. In step S219, the pair of 7-segment LEDs 315a for the first and second figures are flashed. The numeric value to be shot-recorded involves the use of the low-order two figures of the year number according to any data recording function.

In step S220, whether the data recording flag is set on (1) or off (0) is judged. If set on, the action moves to step S221. Whereas if set off, the action returns to step S211.

In step S221, the pair of 7-segment LEDs 315b for the third and fourth figures are flashed. The numeric value to be shot-recorded differs depending on the data recording function selected. According to the [Year/Month/Date] function, the low-order two figures of the year number are shot-recorded. In the [Month/Date/Year] function, the month is recorded. The date is recorded in the [Date/Month/Year] function. The hour is recorded according to the [Hour/Minute/Second] function. The higher-order two figures among six figures of set fixed numeric values are recorded according to the [Fixed Numeric Value] function. The higher-order two figures of six figures of present count values are recorded in the [Up Count Value] function.

In step S222, the pair of 7-segment LEDs 315*b* for the third and fourth figures are flashed. In this step, the low-order two figures of the year number are recorded irrespective of the data recording function.

In step S223, the pair of 7-segment LEDs for the first and second figures are flashed. The numeric values to be shot-recorded herein involve the use of higher-order two figures of the year number.

In step S224, whether or not the data recording flag is set on (1) or off (0) is judged. If set on, the action moves to step S225. Whereas if set off, the action returns to step S211.

In step S225, the pair of 7-segment LEDs 315*c* for the fifth and sixth figures are flashed. The numeric values to be shot-recorded herein differ depending on the data recording function selected. According to the [Year/Month/Date] function, the date is recorded. In the [Month/Date/Year] function and in the [Date/Month/Year] function, the year is recorded. The second is recorded according to the [Hour/Minute/Second] function. The low-order two figures among six figures of set fixed numeric values are recorded according to the [Fixed Numeric Value] function. The low-order two figures among six figures of present count values are recorded in the [Up Count Value] function. Thereafter, the action goes back to step S211, and the operations described above are repeated.

In step S211 described above, if the present operation mode is judged to be a setting mode, the action branches off into step S227. In step S227, it is judged whether or not the set mode is finished. When judging that the set mode changes over to the normal mode (the set mode is finished) with a depression of the setting start/end button, the action returns to step S211. If judged to be the set mode, the action moves to step S228.

In step S228, whether or not a numeric value modifying button is pushed down is judged. If judged to be depressed, the action branches off into step S229 and thereafter moves to step S230. Whereas if judged not to be depressed, the action moves directly to step S230.

The numeric values are updated in step S229. A value 1 is added to the 2-figure numeric values modifiable but flicker-displayed at the present.

In step S230, Whether or not a figure selection button is pushed down is judged. If the figure selection is judged to be depressed, the action moves to step S231. It is assumed that the numeric values of two figures given so far are to be determined. Whereas if the figure selection button is, it is judged, not depressed, the action returns to step S227 to make the numeric values modifiable.

In step S231, the two figures whose numerical value have been modifiable so far are changed into the light-up state from the flickering state. The next two figures are brought into the flickering state, wherein the numeric values are made modifiable. In the case of the least significant two figures being processed so far, the action is returned to the step of the most significant two figures, thereby making the numeric value re-modifiable. Thereafter, the action goes back to step S227, wherein the operations described above are repeated.

An additional explanation will be given while making the setting action of the numeric values corresponding to the actual manipulation of the manipulation button group 208. The numeric values displayed differ depending on the data recording function selected at that time, however, the setting action is fundamentally the same.

When changed over from the normal mode to the setting mode by pushing down the setting start/end button, the third and fourth figures are flickered in four sets of 2-figure indications corresponding to the pairs of 7-segment LEDs 315*a*–315*d*, i.e., in the indicated numeric values of totally eight figures. This indicates that the numeric values are modifiable. When depressing the numeric value modifying button in this state, 1 is added to the present numeric values. Accordingly, desired numeric values can be set by pushing down this button an arbitrary number of times.

After setting the desired numeric values, the third and fourth figures are changed into the light-up state from the flickering state by depressing the figure selection button. Instead, the fifth and sixth figures are flickered. These numerical values can be also set to desired numeric values by depressing the numeric value modifying button an arbitrary number of times. Similarly, desired numeric values are set in the seventh and eighth figures. With the operations conducted above, the desired numeric values are set. Thereafter, the setting mode is changed over to the normal mode by depressing the setting start/end button. The display reverts to the light-up state.

Incidentally, according to the time-related functions such as the [Year/Month/Date], [Month/Date/Year], [Date/Month/Year] and [Hour/Minute/Second] functions among the data recording functions, the arrangement is such that the indications are updated by outputs from an unillustrated timer utilizing a built-in oscillator 244, and the date or the time is always displayed. Further, according to the [Fixed Numeric Value] function, the numeric values of arbitrary six figures are recorded. In the [Up Count Value] function, a one-frame shot is executed. The arrangement is such that 1 is added to an unillustrated internal counter in accordance with an input of the data recording signal, thus effecting the display.

Besides, the data recording/non-recording change button makes a change over to recording or non-recording of the numerical data irrespective of the selection of the functions. Each time this button is pushed down, the recording flag is changed over to (0) or (1). Recording or non-recording can be thus selected.

Next, a relationship of the copyright data recording versus the numerical data recording in the processing routine during the photographing action will be explained with reference to FIGS. 19, 21, 22, 23 and 24 in combination.

In the case of the normal mode, a desired data recording function is selected by depressing the function selecting button. To begin with, there will be given an explanation of a case where the card switch 262 is turned on, and the data recording flag is set to 1 (on), videlicet, both items of the copyright data and the numerical data are shot-recorded.

The photographing film is loaded into the camera 201. The databack 205 is closed. Thereafter, the first one frame of the photographing film is put into a photography standby status by the known initial action. The card 268 is loaded in the loading portion 273 of the databack 205 in the state where the cover member 261 is opened. On this occasion, the card is loaded so that the reference pin 271 coincides with the reference hole 270 of the card. Hence, there is no possibility in which the card 268 is loaded with its up-and-down or surface-and-underside relationship being reversed. When the cover member 261 is closed, the wall surrounding the loading portion 273 enters the groove 275 of the cover member 261, thus intercepting the light as stated before. The engagement member 260 engages with the engagement groove 276, whereby the cover member 261 keeps the closed state.

With the cover member 261 being closed, as illustrated in FIGS. 21 and 22, the edge 296 of the shutter plate 294 is thrust by the cover member 261, resisting the spring 297. The edge 296 is superposed on the hole 295 and the hole 293 of the wall 292, whereby the cover member 261 is changed from the closed state to the opened state. The wall 274, the groove 275, the shutter plate 294 and the wall 292 are constructed so that the opening action of the wall 292 by this shutter plate 294 is performed after the light intercepting action by the groove 275 of the cover member 261. For this reason, there is no possibility wherein the stray light enters from outside with the result that the photographing film is exposed to the light via the hole 267 of the presser plate 214.

When the data recording signal is inputted from the camera 201, the back light LED 301 is flashed for a predetermined time in accordance with steps S214, S215, S216. As a result, the symbol mark and the name relative to the copyright on the mask portion of the card 268 are imaged and recorded from the film rear surface by the lens 287 via the prisms 300, 283. The center of the light path at this time is indicated by the one-dotted line in FIGS. 21 and 22.

Thereafter, the data recording flag is set to 1, and, therefore, the action moves to step S218 of the processing routine.

Figure 29A:
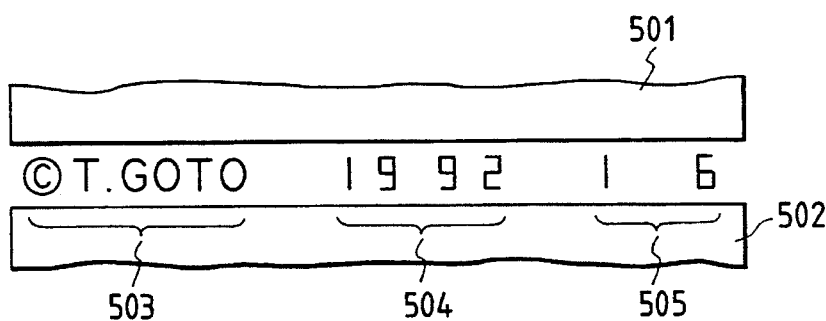
FIGS. 29A to 29D are diagrams showing recorded results by the information recording apparatus.

In step S218, whether or not the data recording function is defined as the [Year/Month/Date] function is judged. In the case of the [Year/Month/Date] function, there is sequentially executed shot-recording of the low-order two figures of the year number with a flash of the LEDs 315b, the high-order two figures of the year number with a flash of the LEDs 315a, the month with a flash of the LEDs 315c and the date with a flash of the LEDs 315d. FIG. 29A illustrates an example of the data recording mode at this time. Referring to FIG. 29A, the numeral 501 designates a photographing picture serving as an object for the present data, and 502 represents a photographing picture of the last time. The numeral 503 denotes a symbol mark and a name of the copyright owner which is intended to claim the copyright. The numeral 504 indicates the year number., and 505 represents a date recorded thereon. The items of data 503–505 are shot-recorded between the photographing picture of this time and the photographing picture 502 of the last time.

Note that the reason why the low-order two figures of the year number are recorded in advance will be elucidated as below. The data having higher importance are sequentially recorded on the assumption that the data can not be recorded midways due to an unexpected accident or the like.

Figure 29B:
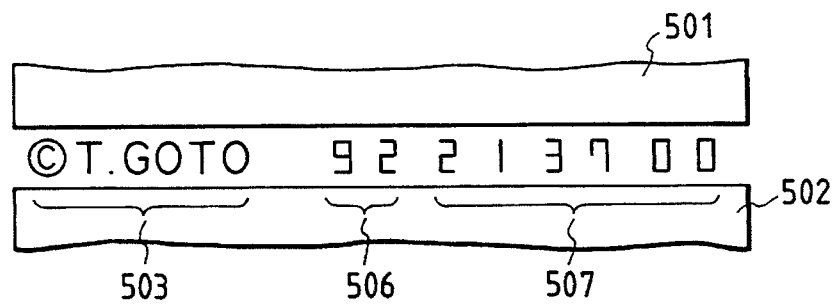

Going back to step S218, the explanation will next be given to a case of being not the [Year/Month/Date] function. At this time, to start with, the low-order two figures of the year number are shot-recorded with a flash of the LEDs 315a. Thereafter, the LEDs 315b, LEDs 315c, LEDs 315d are sequentially flashed in accordance with steps S221, S225, S226. Executed are predetermined shot-records with respect to the set data recording functions. FIG. 29B shows an example of the data recording mode at this time. In this example, the [Hour/Minute/Second] function is selected as the data recording function. Referring to FIG. 29B, the numeral 503 indicates the same with the previous example. However, the numeral 506 represents the low-order two figures of the year number recorded., and 507 designates the hour, minute and second of the photographing time recorded.

Next, there will be discussed a case where the card switch 262 is turned on, and the data recording flag is set to 0 (off), i.e., where not the numerical data but the copyright is shot-recorded.

The card switch 262 is turned on. Hence, the back light LED 301 is flashed in response to an input of the data recording signal in accordance with steps S214, S215, S216. As described above, the copyright symbol mark and name are thus shot-recorded.

Figure 29C:
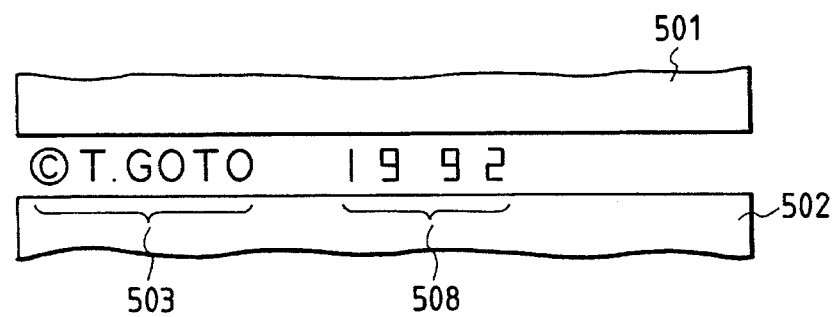

In step S217, the data recording flag is set to 0, and, hence, the action branches off into step S222. The low-order two figures of the year number are shot-recorded with a flash of the LEDs 315b. After this step, the shot-recording of the high-order two figures of the year number is executed by flashing the LEDs 315a. Processing is thus ended. FIG. 29C illustrates an example of the data recording mode at this time. Referring to FIG. 29C, the numeral 503 represents the same with the previous example, but 508 denotes the year number.

Next, there will be explained a case where the card switch 262 is turned off, and the data recording flag is set to 1 (on), viz., where not the copyright data but the numerical data are recorded.

In step S215, the card switch 262 is turned off, and therefore the action branches off into step S220 without flashing the back light LED 301.

Figure 29D:
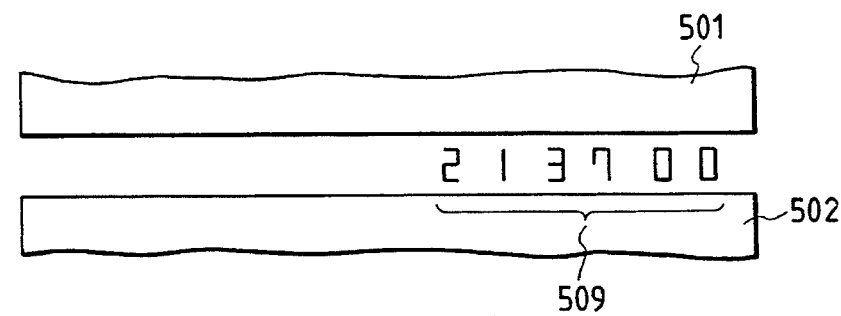

Thereafter, the LEDs 315b, LEDs 315c, LEDs 315d are sequentially flashed in accordance with steps S221, S225, S226. The predetermined shot-records with respect to the set data recording functions are executed. FIG. 29D illustrates an example of the data recording mode at this time. In this example, the [Hour/Minute/Second] function is selected as the data recording function. Referring to FIG. 29D, the numeral 509 represents an hour, minute and second.

Explained finally is a case where the card switch 262 is turned off, and the data recording flag is set to 0 (off), videlicet, where both items of the copyright data and the numerical data are not shot-recorded.

At this moment, the action branches off at step S215 into step S222. The action, however, returns thereat to step S211. Consequently, no LED is flashed. Hence, nothing is shot-recorded on the photographing film, thus finishing a series of photographing actions.

The explanation of the relationship of the copyright data recording versus the numerical value recording functions has so far been ended. Next, a method of deleting the recorded letters will be discussed.

The photographer has taken a photo including the above-described record of the copyright. Thereafter, if aware of the fact that an intended picture can not be taken for some reason, there may arise a necessity for deleting the shot-recorded data associated with the copyright. There will be stated an operation method and action in such an instance in accordance with this embodiment. In the apparatus in this embodiment, the detection of the copyright information which has been recorded involves the use of the following method.

To start with, the photographing film is rewound up to the photographing picture containing the copyright information to be deleted. In this state, the card 268 is taken off, while the cover member 261 is closed. The card switch 262 is turned on to perform shutter releasing. As described earlier, the back light LED 301 is flashed in conformity with a predetermined routine. The card 268 is not, however, loaded thereinto, and therefore the photographing film surface is irradiated with the uniform light. Accordingly, the entire exposure to the uniform light is superposed on the copyright record which has so far been latent in terms of its image. The copyright information is deleted, thus attaining the object. In the case of making an attempt to store the photographing picture, as in the same way as a normal nonprocess shot, the shutter release may be effected with the lens being covered so that the already-photographed picture is not exposed.

The fourth embodiment discussed above is constructed to execute, by the different methods, the shot-records of the copyright symbol mark and the name of the copyright owner that require letters other than the numeric values and the shot-records of the data or time data such as the year number that use only the numeric values for recording. An optimum method can be selected in terms of the costs and space as well. Accordingly, there is obtained such an effect that the copyright data can be simply shot-recorded by employing no complicated circuitry and no special light emitting element.

These two kinds of data shot-recording means are independently constructed. Both of them can be regulated in their positions in the photographing film feeding direction with respect to the photographing picture. The shot-recording can be conducted in alignment in the most optimal position with respect to the photographing picture. Hence, the data are shot-recorded on an extremely narrow space between the photographing pictures. Nevertheless, the data can be recorded in a well-arranged manner with respect to the object picture and an adjacent picture.

Further, the arrangement is such that there is automatically made a selection as to whether all the figures or the low-order two figures of the year number relative to the copyright are recorded depending on data recording situations of other items of numerical data. Therefore, on the occasion of recording the copyright data, there is caused no such inconvenience that some restraint is applied to the records of other items of numerical data.

Moreover, according to the construction of the fourth embodiment, the copyright symbol mark and the name of the copyright owner are recorded all the time in advance of other data. Accordingly, even when encountering an unexpected situation such as an abrupt consumption of the battery when at low temperatures, there increases a probability that the more important data are to be recorded.

Further, as a secondary effect, if it is predicted that the photographing picture does not turn out as intended, the mark and the name relative to the copyright can be completely deleted by rewinding the photographing film.

Note that the present invention can be, though not explained in the fourth embodiment, modified as follows. A judging unit judges, when detecting a data quantity (length) of the copyright mark and the copyright owner's name (first data), a magnitude of the data quantity (length) with respect to a predetermined data quantity (length). When the judging unit judges that the data quantity (length) of the copyright mark and the copyright owners's name (first data) is larger than the predetermined data quantity (length), a control unit inhibits the recording action (of the data on the year number) by a second recording unit. The essence in this modified example is that the copyright mark and the copyright owner's name are shot-recorded with priority to the data on the year number in terms of the data quantity (length).

It is apparent that, in this invention, a wide range of different working modes can be formed based on the invention without deviating from the spirit and scope of the invention. This invention is not restricted by its specific working modes except being limited by the appended claims.

What is claimed is:

1. An information recording apparatus capable of recording a plurality of items of information on a photographic film, said information recording apparatus comprising:

a first recorder for recording first information in a first position in the vicinity of a photographing frame on said film, the first recorder including a card member, being attachable to and detachable from the information recording apparatus, having a masking plate on which said first information is recorded as to be identifiable, a mask portion through which said first information is identifiable from outside, and a switch manipulatable from outside, and a light source for irradiating said mask portion with light, wherein said light source does not irradiate said mask portion with the light if said switch is turned off;

a second recorder for recording second information different from said first information in a second position different from said first position but in the vicinity of said photographing frame; and a controller for controlling said first and second recorders independently.

2. An information recording apparatus which is capable of recording information on a recording medium, said information recording apparatus comprising:

a card member having a masking plate on which information is recorded as to be identifiable, a mask portion on which said information is identifiable from outside, and a switch manipulatable from outside, said card member being attachable to and detachable from said information recording apparatus; and a recorder, for recording said information on said recording medium, including a light source for irradiating said mask portion with light and recording said information on said recording medium with the irradiation by said light source, wherein said light source does not irradiate said mask portion with the light if said switch is turned off.

3. An information recording apparatus capable of recording information on a recording medium, comprising:

a first recorder for recording first information indicating a copyright on said recording medium;

a second recorder capable of recording second information consisting of numerals on said recording medium and having a first mode in which said second information is recorded in a predetermined number of figures and a second mode in which said second information is recorded in a number of figures more than said predetermined number of figures;

a third recorder for recording third information consisting of letters on said recording medium;

a discriminator for judging whether or not the number of letters of said third information is smaller than a predetermined number of letters; and a mode selector for selecting one of said first and second modes responsive to a result of judgment by said discriminator and for causing said second recorder to effect recording in the selected mode, wherein, if said number of letters of the third information is not smaller than said predetermined number of letters, said first mode is selected, and if said number of letters of the third information is smaller than said predetermined number of letters, said second mode is selected.

4. An information recording apparatus according to claim 3, wherein said third recorder performs recording with a portion thereof being shared with said second recorder.

5. An information recording capable of recording information on a recording medium comprising:

a first recorder for recording first information indicating a copyright on said recording medium:

a second recorder for recording second information consisting of numerals on said recording medium;

a third recorder capable of recording third information consisting of letters on said recording medium and having a first mode in which said third information is recorded in a predetermined form and a second mode in which said third information is recorded in a scaled-down form smaller than said predetermined form;

a discriminator for judging whether or not the number of letters of said third information is smaller than a predetermined number of letters; and a mode selector for selecting one of said first and second modes responsive to a result of judgment by said discriminator and for causing said second recorder to effect recording in the selected mode, wherein, if said number of letters of the third information is smaller than said predetermined number of letters, said first mode is selected, and if said number of letters of the third information is not smaller than said predetermined number of letters, said second mode is selected.

6. An information recording apparatus according to claim 5, wherein said first mode is a mode in which letter information is recorded in a full-width form and said second mode is a mode in which the letter information is recorded in a half-width form.

7. An information recording apparatus capable of recording a plurality of items of information on a photographing film, comprising:

a first recorder for recording first information in a first position in the vicinity of a photographing frame on said film, the first recorder including a card member having a masking plate on which said first information is so recorded as to be identifiable and a mask portion through which said first information is identifiable from outside, the card member being attachable to and detachable from the information recording apparatus, wherein the first recorder is capable of deleting said first information recorded on said film by effecting recording when said card is not loaded;

a second recorder for recording second information different from said first information in a second position different from said first position but in the vicinity of said photographing frame; and a controller for controlling said first and second recorders independently.

8. A method of recording information on a recording medium comprising:

comparing a number of letters of literal information and a predetermined number of letters so as to judge whether or not the number of letters of the literal information is smaller than said predetermined number;

recording, if said number of letters of the literal information is not smaller than said predetermined number of letters, numerical information on said recording medium in a predetermined number of figures; and recording, if said number of letters of the literal information is smaller than said predetermined number of letters, said numerical information on said recording medium in a number of figures more than said predetermined number of figures.

9. A method of recording information on a recording medium comprising:

comparing a number of letters of literal information and a predetermined number of letters so as to judge whether or not the number of letters of the literal information is smaller than said predetermined number;

recording, if said number of letters of the literal information is smaller than said predetermined number of letters, numerical information on said recording medium in a predetermined form; and recording, if said number of letters of the literal information is not smaller than said predetermined number of letters, said numerical information on said recording medium in a scaled-down form smaller than said predetermined form.

* * * * *

UNITED STATES PATENT AND TRADEMARK OFFICE
CERTIFICATE OF CORRECTION

PATENT NO. : 5,471,267
DATED : November 28, 1995
INVENTOR(S) : GOTO et al.

It is certified that error appears in the above-indentified patent and that said Letters Patent is hereby corrected as shown below:

Column 25, line 4, "recording capable" should be --recording apparatus capable--.

Signed and Sealed this

Sixteenth Day of April, 1996

Attest:

BRUCE LEHMAN

*Attesting Officer*  *Commissioner of Patents and Trademarks*